US010689044B2

(12) United States Patent
Tolley et al.

(10) Patent No.: US 10,689,044 B2
(45) Date of Patent: Jun. 23, 2020

(54) RESILIENT, UNTETHERED SOFT ROBOT

(71) Applicant: President and Fellows of Harvard College, Cambridge, MA (US)

(72) Inventors: Michael T. Tolley, Cambridge, MA (US); Robert F. Shepherd, Brooktondale, NY (US); Bobak Mosadegh, Boston, MA (US); Robert J. Wood, Cambridge, MA (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 752 days.

(21) Appl. No.: 14/755,026

(22) Filed: Jun. 30, 2015

(65) Prior Publication Data

US 2015/0375817 A1    Dec. 31, 2015

Related U.S. Application Data

(60) Provisional application No. 62/018,965, filed on Jun. 30, 2014.

(51) Int. Cl.
*B62D 57/02* (2006.01)
*B25J 9/14* (2006.01)
*B25J 18/06* (2006.01)

(52) U.S. Cl.
CPC .............. *B62D 57/02* (2013.01); *B25J 9/142* (2013.01); *B25J 18/06* (2013.01); *Y10S 901/01* (2013.01);
(Continued)

(58) Field of Classification Search
CPC .... B62D 57/021; B62D 57/032; B62D 57/02; B25J 18/06; B25J 19/142; B25J 9/142
See application file for complete search history.

(56) References Cited

U.S. PATENT DOCUMENTS 3,066,637 A * 12/1962 Akutowicz ............ B63H 19/00
                                                        180/7.1
3,343,864 A *  9/1967 Baer .................... B25J 15/0009
                                                        294/119.3
(Continued)

FOREIGN PATENT DOCUMENTS

WO    WO-2012/148472 A2    11/2012
WO    WO-2013103412 A2     7/2013
(Continued)

OTHER PUBLICATIONS

International Search Report and Written Opinion issued by the U.S. Patent and Trademark Office as International Searching Authority for International Application No. PCT/US15/38492 dated May 12, 2016 (12 pages).

*Primary Examiner* — Anne Marie M Boehler
(74) *Attorney, Agent, or Firm* — Wilmer Cutler Pickering Hale and Dorr LLP

(57) ABSTRACT

A pneumatically powered, fully untethered mobile soft robot is described. Composites consisting of silicone elastomer, polyaramid fabric, and hollow glass microspheres were used to fabricate a sufficiently large soft robot to carry the miniature air compressors, battery, valves, and controller needed for autonomous operation. Fabrication techniques were developed to mold a 0.65 meter long soft body with modified Pneumatic network actuators capable of operating at the elevated pressures (up to 138 kPa) required to actuate the legs of the robot and hold payloads of up to 8 kg. The soft robot is safe to handle, and its silicone body is innately resilient to a variety of adverse environmental conditions including snow, puddles of water, direct (albeit limited) exposure to flames, and the crushing force of being run over by an automobile.

17 Claims, 20 Drawing Sheets

(52) U.S. Cl.
CPC ............ *Y10S 901/09* (2013.01); *Y10S 901/22* (2013.01); *Y10S 901/27* (2013.01)

(56) References Cited

U.S. PATENT DOCUMENTS

| | | | | |
|---|---|---|---|---|
| 3,623,566 | A * | 11/1971 | Orloff | B62D 57/021 180/7.1 |
| 3,693,740 | A * | 9/1972 | Lewis | B60V 3/025 180/8.1 |
| 3,831,691 | A * | 8/1974 | Jenkins | B60V 3/025 180/119 |
| 3,866,652 | A | 2/1975 | Ahmad | |
| 3,985,064 | A * | 10/1976 | Johnson | B62D 57/00 198/630 |
| 4,227,608 | A * | 10/1980 | Alfthan | B62D 57/021 180/8.1 |
| 4,832,168 | A * | 5/1989 | Farmer | B65G 35/00 180/7.1 |
| 5,156,081 | A | 10/1992 | Suzumori | |
| 5,833,291 | A * | 11/1998 | Haugs | A61G 7/001 294/119.3 |
| 6,595,350 | B1 * | 7/2003 | Stouffer | B65G 7/02 198/630 |
| 9,777,753 | B2 * | 10/2017 | Niiyama | F15B 15/103 |
| 2002/0157388 | A1 | 10/2002 | Seto et al. | |
| 2005/0218679 | A1 | 10/2005 | Yokoyama et al. | |
| 2007/0079997 | A1 * | 4/2007 | Chan | B62D 57/00 180/7.1 |
| 2010/0258362 | A1 * | 10/2010 | Trimmer | A63H 11/18 180/7.1 |
| 2012/0175171 | A1 * | 7/2012 | Bradley | B62D 57/00 180/7.1 |
| 2012/0216672 | A1 | 8/2012 | Menon et al. | |
| 2014/0083230 | A1 | 3/2014 | Calisti et al. | |
| 2015/0257839 | A1 * | 9/2015 | Vause | A61B 17/22032 606/130 |
| 2016/0075036 | A1 * | 3/2016 | Lessing | B25J 9/142 361/234 |
| 2016/0136820 | A1 * | 5/2016 | Lessing | B25J 15/10 294/208 |
| 2017/0029592 | A1 * | 2/2017 | Shepherd | C08J 9/10 |
| 2017/0119614 | A1 * | 5/2017 | Yeow | A61H 1/0288 |

FOREIGN PATENT DOCUMENTS

| | | |
|---|---|---|
| WO | WO-2013110086 A1 | 7/2013 |
| WO | WO-2013/130760 A2 | 9/2013 |
| WO | WO-2013/148340 A2 | 10/2013 |

\* cited by examiner

PRESSURE: 139 kPa (20 psi)
MAX LIFT = 3.4 kg (7.5 lbs)

MAX HOLD = 8.0 kg (17.6 lbs)

RESILIENT, UNTETHERED SOFT ROBOT

RELATED APPLICATION

This application claims the benefit of priority under 35 U.S.C. § 119(e) to U.S. Application Ser. No. 62/018,965, filed Jun. 30, 2014, the contents of which are incorporated in their entirety by reference.

STATEMENT REGARDING FEDERALLY SPONSORED RESEARCH OR DEVELOPMENT

The present invention was made with United States government support under Grant No. W911NF-11-1-0094 awarded DARPA and under Grant No. ER45852 awarded by the Department of Energy. The United States government may have certain rights in this invention.

INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD

This technology relates generally to soft robots. In particular, this invention relates to an untethered soft robots.

BACKGROUND

There is a nascent class of robots—so called "soft" robots—that contain no (or few) rigid internal structural elements, and are loosely modeled on animals with non-rigid body parts (starfish, squid, and others). Many of these soft robots are actuated pneumatically using gas transferred to them from a stationary source via a flexible tether. The limitations imposed by size are one primary reason that they have been designed to function with compressed gas supplied through an external pneumatic tether. Although this tether may interfere with some tasks, it is often an advantage rather than a disadvantage for others: for example, it enables the transfer or sampling of fluids and solids and facilitates electronic communication and optical observation.

Many soft robots rely on compressed air that is introduced through a tether from a source of compressed air, e.g., a pressurized cylinder or other pressurized gas source. The robot is limited in its mobility by the length and number of tethers. In addition, the tethers can add significant weight required for the soft robot to move along with it, as it perambulates. Other attempts at on-board power source include chemical pumps or other chemical systems that generate gas on site on the soft robot.

Robots intended for use outside of laboratory environments should be able to operate without the constraints of a tether; this is especially true for robots intended to perform demanding tasks in challenging environments (for example, for search and rescue applications in unstable rubble).

SUMMARY

Composite soft materials, a mechanical design, and a fabrication method that enable the untethered operation of a soft robot are described. This robot can operate in two modes: using a battery pack (for several hours), and using a very light-weight electrical tether (for much longer periods). In one or more embodiments, these robots are composed primarily of synthetic elastomers. The soft untethered robots are capable of operating outside a forgiving laboratory environment: in a snowstorm, in puddles of water, and in direct (albeit limited) exposure to flames.

In one aspect, a load bearing soft robot is described, including one or more actuators responsive to pneumatic pressure; an electrically powered air compressor for providing pneumatic pressure to the one or more actuators; and a housing for accommodating the electrically activated air compressor on the soft robot.

In one or more embodiments, the soft robot further includes an on-board power source for operation of the electrically powered air compressor, or an electrical wire connection connectable to an off-board power source.

In any of the preceding embodiments, the soft robot further includes a valve system for reversible fluid communication between the one or more actuators and the electrically powered air compressor.

In any of the preceding embodiments, the soft robot further includes a control system for controlling the operation of the electrically powered air compressor and/or the valves.

In any of the preceding embodiments, the control system controls the operation of the valve system.

In any of the preceding embodiments, the soft robot further includes a load, and for example, the load is selected from sensors or audio or visual recording or transmitting devices.

In any of the preceding embodiments, the one or more actuator comprises interconnected chambers of an elastomeric composite comprising hollow sphere embedded in an elastomer.

In any of the preceding embodiments, the one or more actuator comprises interconnected chambers of an elastomeric foam.

In any of the preceding embodiments, the elastomer has an elastic modulus of greater 2 MPa, or greater than 5 MPa, or greater than 7 MPa, or greater than 8 MPa, or greater than 10 MPa.

In any of the preceding embodiments, the elastomer is capable of greater than 400%, greater than 500% strain, or greater than 600% strain, or greater than 700% strain, or greater than 800% strain without failure.

In any of the preceding embodiments, the elastomeric composite or the elastomeric foam is capable of greater than 400%, greater than 500% strain, or greater than 600% strain, or greater than 700% strain, or greater than 800% strain without failure.

In any of the preceding embodiments, the at least one actuator comprises a plurality of chambers comprised of an extensible material, the chambers having interior side walls and exterior top and side walls, wherein at least a portion of the interior side wall is separated from an interior side wall of an adjacent chamber and wherein at least a portion of the exterior side walls is connected to adjacent chamber side walls; and a strain limiting base attached as a bottom wall of the actuator.

In any of the preceding embodiments, the soft robot has at least one dimension of 0.5 m or greater.

In any of the preceding embodiments, the actuators can withstand a pressure of greater than 150 kPa, or greater than 170 kPa.

In another aspect, a soft robot having restoring force after actuation is described including at least one actuator having a plurality of chambers comprised of an extensible material, the chambers having interior side walls and exterior top and side walls, wherein at least a portion of the interior side wall is separated from an interior side wall of an adjacent chamber and wherein at least a portion of the exterior side walls is connected to adjacent chamber side walls; a strain limiting base attached to as a bottom wall of the actuator; and a channel that fluidically interconnects the plurality of chambers, wherein the interior walls are configured to be more compliant than the exterior walls.

In one or more embodiments of, a soft robot having restoring force after actuation, the top exterior walls of the chamber is separate from the top exterior wall of an adjacent chamber.

In any of the preceding embodiments of a soft robot having restoring force after actuation, the one or more actuator are comprised of an extensible material, the extensible material comprised of a elastomeric composite comprising hollow sphere embedded in an elastomer.

In any of the preceding embodiments of a soft robot having restoring force after actuation, the one or more actuator are comprised of an extensible material, the extensible material comprised of an elastomeric foam.

In another aspect, a lightweight, high strength soft robot includes at least one actuator having a plurality of interconnected chambers comprised of an extensible material, wherein the actuator comprises void space or hollow spheres embedded in the extensible material; and a strain limiting base attached to as a bottom wall of the actuator.

In one or more embodiments of a lightweight, high strength soft robot, the elastomer has an elastic modulus of greater 2 MPa, or greater than 5 MPa, or greater than 7 MPa, or greater than 8 MPa, or greater than 10 MPa.

In any of the preceding embodiments of a lightweight, high strength soft robot, the elastomer is capable of greater than 400%, greater than 500% strain, or greater than 600% strain, or greater than 700% strain, or greater than 800% strain without failure.

In any of the preceding embodiments of a lightweight, high strength soft robot, the elastomeric composite or the elastomeric foam is capable of greater than 400%, greater than 500% strain, or greater than 600% strain, or greater than 700% strain, or greater than 800% strain without failure.

In any of the preceding embodiments, the lightweight, high strength soft robot further includes an electrically powered air compressor for providing pneumatic pressure to the one or more actuators.

In any of the preceding embodiments, the lightweight, high strength soft robot further includes an on-board power source for operation of the electrically powered air compressor, or the lightweight, high strength soft robot further includes an electrical wire connection connectable to an off-board power source.

In any of the preceding embodiments, the lightweight, high strength soft robot further includes a valve system for reversible fluid communication between the one or more actuators and the electrically powered air compressor.

In any of the preceding embodiments, the lightweight, high strength soft robot further includes a control system for controlling the operation of the electrically powered air compressor and/or the valves.

In any of the preceding embodiments, the control system controls the operation of the valve system.

In any of the preceding embodiments, the soft robot further includes a load, and optionally the load is an on-board actuator, for example, selected from the group consisting of air compressors, hydraulic actuators, explosive actuators.

In any of the preceding embodiments, the load includes a power source, and optionally, the power source is selected from the group consisting of batteries, photovoltaic devices, and liquid, gas or solid fuels.

In any of the preceding embodiments, the load includes a sensor or communications system.

A 0.65 m long soft robot is described that can carry its own weight, all the components necessary for up to two hours of untethered operation, plus an additional payload (e.g. surveillance equipment), across smooth terrain. The untethered soft robot was made of a silicone (M4601) that was tougher than Ecoflex 0030 silicone elastomer and able to support larger loads (the body of the robot, plus components for untethered operation). The silicone included glass hollow spheres to reduce its weight. Although the glass hollow spheres reduced the extensibility of the material, they did not reduce the toughness of the material (the integral of the stress-strain curve). Simultaneously, the new design of the pneumatic network architecture allows the use of the slightly less extensible composite with no loss in functionality.

The capabilities and surprising resilience of this soft robot has been confirmed experimentally. The larger soft robot possesses a turning gait and showed multi-gait capabilities, is capable of untethered video reconnaissance, suitable for search and rescue missions. The robot can perform these and other functions in a range of harsh environmental conditions.

These and other aspects and embodiments of the disclosure are illustrated and described below.

BRIEF DESCRIPTION OF THE DRAWINGS

The invention is described with reference to the following figures, which are presented for the purpose of illustration only and are not intended to be limiting.

FIG. 3A show the robot starts moving forward with a straight ambulatory gait.

FIGS. 3B and 3C show that the robot switches to a turning gait to explore a passageway on the left.

FIG. 3D shows the robot uses its onboard camera to image a hidden laptop.

FIG. 3F shows the robot depressurizes it's actuators in preparation for impact; FIG. 3G shows a car running over the elastomeric legs of the soft robot and FIG. 3H demonstrates that the soft robot can still function.

FIGS. 8A-8J show a series of frames from movies of the untethered soft robot executing undulating and ambulating gaits, in which FIGS. 8A-8F illustrate an undulating gait by sequentially inflating the pneumatic channels from the rear of the robot toward the front, resulting in forward motion (dotted lines mark the starting position for reference); and FIGS. 8G-8J illustrate an ambulating gait by, starting from rest (FIG. 8G), a rear leg is actuated (FIG. 8H), the opposite front leg is then actuated to shift the weight forward (FIG. 8I) and repeating this sequence on alternating sides, resulting in a straight ambulatory gait (FIG. 8J). Open circles on the figures in the upper-right corner of each frame indicate which PNs are currently actuated (pressurized), circles with X's indicate unactuated PNs. The time elapsed since the start of the gait is indicated on each frame and the pressurized pneumatic networks are indicated by circles and unpressurized pneumatic networks are indicated by X's.

DETAILED DESCRIPTION

Figure 1A:
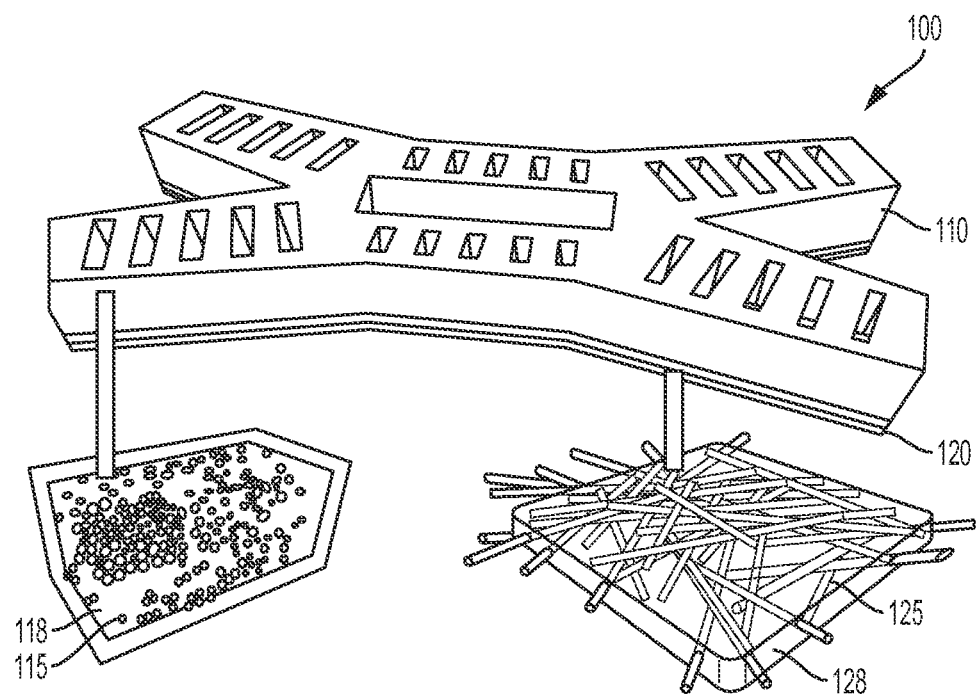
FIG. 1A illustrates composites according to one or more embodiments, in which two material composites are used in the soft robot; the top layer of the robot (110) is a blend of hollow glass spheres in silicone, and the bottom layer (120) is a Nylon mesh impregnated with the same silicone.

Soft robots capable of resilient untethered operation are provided. In one aspect, the soft robot includes one or more actuators responsive to pneumatic pressure; an electrically powered air compressor for providing pneumatic press to the one or more actuators; and a housing for accommodating the electrically activated air compressor on the soft robot. The housing can also accommodate a power source and a control system for operation of the air compressor.

The present disclosure also provides soft robots with sufficient size and strength to support the power system, e.g., power supply, electrically powered air compressor, fluid valves and controller, that drives the soft robot. Previously described soft robots have not been sufficiently large (~15 cm in largest dimension), nor actuated at sufficiently high pressures (~0.5 atm; 7 psi; ~48 kPa) to support the size or weight of commercially available power supplies (e.g., batteries and compressed gas cylinders) and the other components (e.g., valves, air compressors, circuit boards) necessary to operate autonomously. The soft robots according to one or more embodiments, can have a largest dimension of greater than 25 cm, or greater than 50 cm, or greater than 60 cm, greater than 70 cm, greater than 80 cm, greater than 90 cm, or greater than 100 cm (1 m), or any range bounded by the dimension stated above.

In another aspect, the soft robot is fabricated using materials and designs that provide strength and size sufficient to support a load, such as the on-board pneumatic pumps and control system. In one or more embodiments, the soft robot can carry loads of up to 8 kilograms. The soft robot comprises at least one actuator having a plurality of interconnected chambers comprised of an extensible material, wherein the actuator comprises void space or hollow spheres embedded in the extensible material to lower the density and reduce the weight of the actuator. To accommodate the heavier load and larger size of the soft robot, the robot can use an elastomer having a higher elastic modulus than previously made soft robots. In one or more embodiments, the elastic material has an elastic modulus of greater than 1 MPa. In other embodiments, the elastomer has an elastic modulus of greater 2 MPa, or greater than 5 MPa, or greater than 7 MPa, or greater than 8 MPa, or greater than 10 MPa. The elastic material also can have an elastic modulus in a range bounded by any of the values stated hereinabove. In other embodiments, it is also desirable that the elastomer retain a high degree of extensibility (% strain to failure), so that the soft robot is capable of operation through a full range of expansion without failure. In one or more embodiments, the elastomer for use in the resilient soft robots according to one or more embodiments, is capable of greater than 400%, greater than 500% strain, or greater than 600% strain, or greater than 700% strain, or greater than 800% strain, or higher without failure. The elastic material also can have an elasticity in a range bounded by any of the values stated hereinabove.

In one or more embodiments, the soft robots can be made of silicone. Silicone robots inherit the strengths of silicone rubbers, including: being impervious to water, good acid/base stability, and resistance to damage from blunt impacts or applied pressures. This material has a glass transition temperature (depending on additives) of ~−120° C., and thermal stability to temperatures up to ~400° C. Silicone soft robots are thus, in principle, capable of operating in environments in which temperature has a wide range. In addition, many siloxane derived polymers are: (i) hydrophobic (i.e., water resistant) and energetically stable to corrosive, nucleo- and electrophilic attack from many polar moeties (ii) resistant to ultraviolet (UV) light, and thus stable in intense sunlight over several decades; and (iii) fire resistant, so capable of surviving brief, but direct, exposure to flames. They are also safer in direct contact with humans. In addition, monolithic molded mechanisms (such as the body of the robot presented here) are relatively less prone to failure than their assembled counterparts due to the absence of sliding parts (e.g. bearings), and reduced assembly interfaces and associated fasteners/adhesives.

The weight of the soft robot is reduced by incorporation of void spaces into the elastomer body. In one or more embodiments, void spaces can be introduced by incorporating hollow spheres into the elastomer. Exemplary hollow spheres include glass spheres, which are lightweight, transparent and of low cost; however, polymer spheres or any hollow sphere can be used. The load of the hollow spheres can be about 1-15% wt/wt of the composite, or about 2%, 3%, 4%, 5%, 6%, 7%, 8%, 9%, 10% 11%, 12%, 13%, 14% by weight or any ranges bounded by any of these values. Large loads of hollow spheres are not needed. For example, in one embodiment, the weight of the soft robot was reduced by 40% by the addition of 8% by weight hollow spheres.

In other embodiments, the density and thereby the weight of the elastomer body can be reduced by using an elastomer foam for the actuator. In one or more embodiments, silicone foam prepolymers can be used.

The actuator also includes a strain limiting layer, that is, a layer of less extensibility than the elastomer used to form the pneumatic networks. A higher modulus material can be used for the base where inflation is undesirable, while a low elastic modulus material can be used for the chambers where extensibility is needed. In other embodiments, the strain limiting base can be an elastomeric layer of low modulus including a stiffer, yet still pliable backing layer. In other embodiments, the stiffer backing layer may include an inextensible backing material, such as paper or fabric, embedded in the base. In one or more embodiments, high strength polyaramid fibers, e.g., Kevlar® fabric, or Nylon mesh can be used. The strain limiting layer is prepared using high strength, low weight materials to provide the desired strain limiting property to the actuator, without significant addition of weight.

The higher strength, lower density elastomeric material can be molded to form the pneumatic networks, (e.g., interconnected chambers) used to actuate the robot. The hollow spheres and void spaces results in a lighter device. The greater modulus of the material allows the robot to carry its own greater weight and that of the on-board power system. In addition, it is better able to withstand higher internal chamber pressures, which can be required to actuate the large devices. In exemplary systems, the soft robots are able to withstand external pressures of more than 150 kPa or more than 170 kPa.

FIG. 1A illustrates an embodiment of the low weight, high strength soft robot 100 according to one or more embodiments. The soft robot includes a top layer 110 made of silicon elastomer 118 blended with hollow glass spheres 115 and a bottom strain limiting layer 120 made of nylon mesh 125 embedded in silicone elastomer 128. FIG. 1A also shows expanded views of top layer 110 illustrating the hollow glass spheres 115 forming the low weight composite material used to form the upper elastomeric layer and bottom layer 120 illustrating the reinforcing fibers 125 forming the high strength composite material used to form the lower strain limiting layer. The upper layer is made of a higher modulus silicone, M4601 silicone (elastic modulus ~7 MPa), to provide the desired toughness and strength. In some embodiments, the lower layer can be made using a softer silicone, Ecoflex 0030 (elastic modulus ~0.1 MPa), as the strength derives from the fiber reinforcement. In some embodiments, the stiffer M4601 silicone can be used for both layers. Using silicone elastomer for both the upper and lower layers helps form a strong seal between the two layers. It is possible for example to use a silicone precursor as a 'glue' which can be cured with the upper and lower layers to form an integral seal between the layers.

The soft robot can take on any geometry or design that reflects the intended use of the robot. Multiple actuators can be combined to permit a range of motions and functions. For example, the soft robot can include actuators that function as 'legs' to allow the robot to move and 'arms' and 'hands' to allow the robot to grasp and move objects. It can also include pneumatic networks that stiffen the robotic frame when actuated. The ability to stiffen the soft robot frame can be of use when carrying the heavy loads contemplated in this disclosure. Exemplary pneumatic network designs are provided in PCT/US2011/61720 (Soft Robotic Actuators), PCT/US2013/28250 (Apparatus, System and Method for Providing Fabric-Elastomer Composites as Pneumatic Actuators), PCT/US2013/22593 (Flexible Robotic Actuators), PCT/US2013/32297 (Systems and Methods for Providing Flexible Robotic Actuators), U.S. Ser. No. 61/867,845 (Low Strain Pneumatic Networks for Soft Robots) and 61/885,092 (Manufacturing Soft Robots Using Sheet Materials), all of which are incorporated in their entirety by reference.

In another aspect, the pneumatic network is designed to provide rapid actuation with low pressures and to provide a restoring force that returns the network back to its resting state. The elastomer material can stretch during actuation and the pneumatic network does not return to its initial resting state, for example, due to the influence of gravity on the arm. The arm can 'droop' and not return to a fully linear conformation.

A soft robot having restoring force after actuation includes at least one actuator having a plurality of chambers comprised of an extensible material, the chambers having interior side walls and exterior top and side walls, wherein at least a portion of the interior side wall is separated from an interior side wall of an adjacent chamber and wherein at least a portion of the exterior side walls is connected to adjacent chamber exterior side walls. The top exterior walls can also be spaced apart from adjacent top exterior walls. The plurality of chambers attach to the strain limiting layer at their base. By separating the pneumatic chambers, but leaving side walls connected, the robot demonstrates rapid actuation, but with a restoring force sufficient for walking gaits.

Figure 2A:
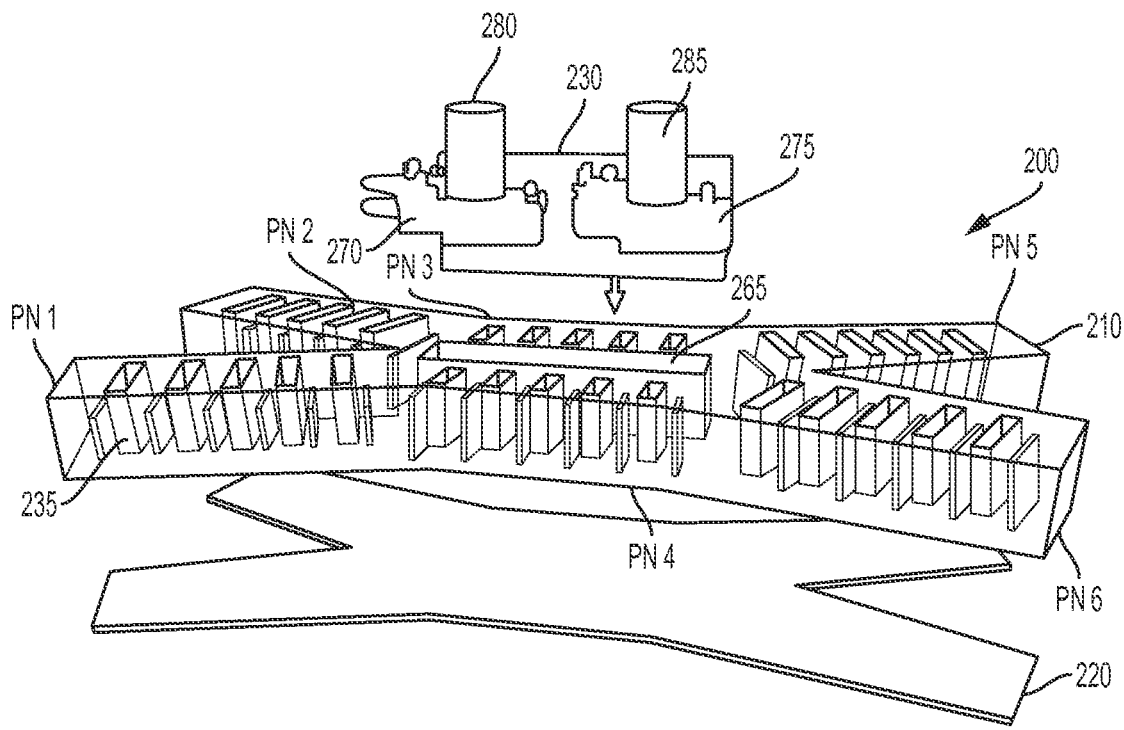
FIG. 2A is an exploded view of an untethered quadrupedal soft robot according to one or more embodiments, including a schematic representation of the components of the mini air compressor (MAC) driven, battery powered soft robot and Layer 1 consisting of six Pneumatic networks sealed onto layer 2.

FIG. 2A provides an exploded view of an exemplary high strength, low weight soft robot 200, including an upper layer 210 housing the void spaces 235 defining the pneumatic chambers of the robot, lower layer 220 that forms the flexible strain limiting layer and on-board compressor module 230. The upper layer 210 of the high strength, low weight soft robot includes the four operating legs PN1, PN2, PN5 and PN6 and side stiffening actuators PN3 and PN4. The robot includes six pneumatic networks PN1 through PN6, each of which can be individually actuated. PN1, PN2, PN5 and PN6 are capable of bending actuation that allows the robot to walk. PN3 and PN4 serve to stiffen the robot, assisting in supporting the load in the central space, as well as provide a curvature in the spine of the device that assists in certain moving gaits.

Figure 2B:
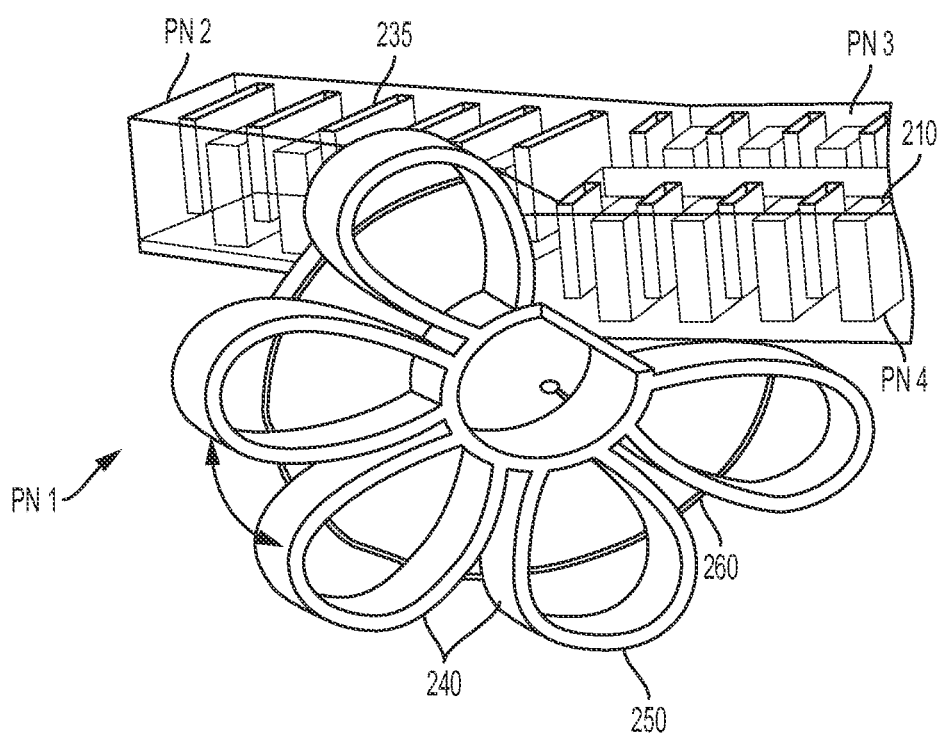
FIG. 2B is a schematic representation of a cross-section of Pneumatic network 1 as its internal pneumatic network in its unpressurized (left) and pressurized (right) state.
Figure 3A:
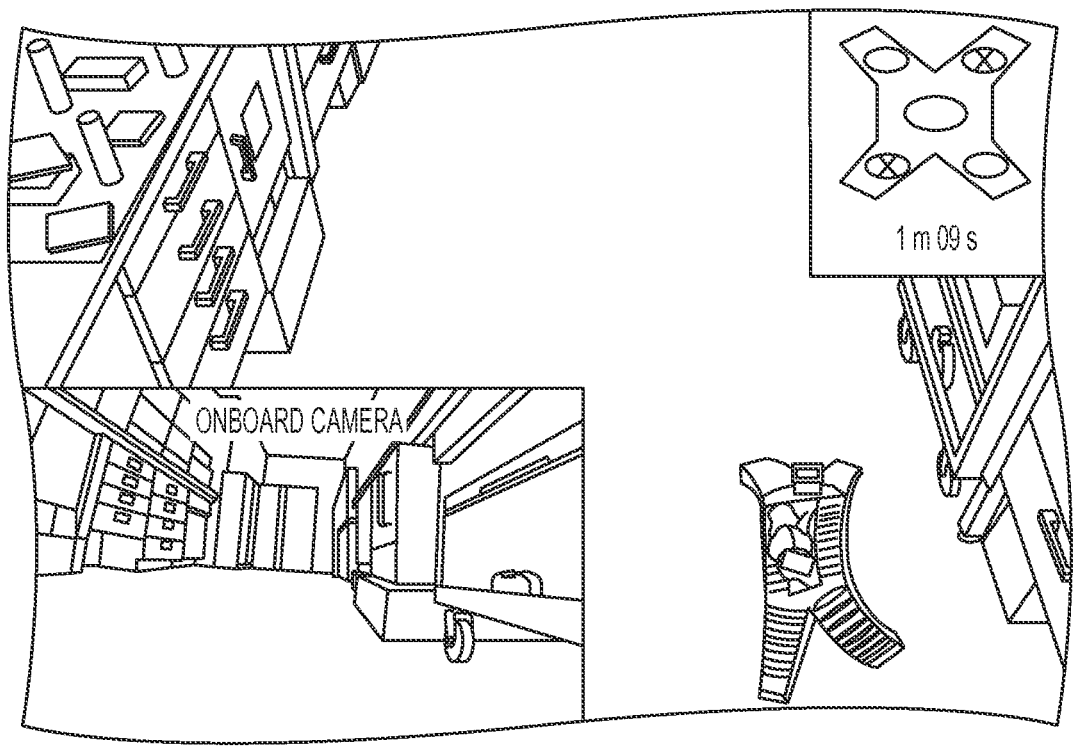
FIGS. 3A-3D demonstrate the untethered operation of a quadrupedal soft robot according to one or more embodiments in which images of the untethered soft robot conducting indoor surveillance include images from an onboard camera view in lower left inset and a cartoon schematic in upper right inset showing sequence of actuation of pneumatic networks, in which open circles on the figures in the upper-right corner of each frame indicate which PNs are currently actuated (pressurized), circles with X's indicate unactuated PNs. The time elapsed since the start of the gait is indicated on each frame and the pressurized pneumatic networks are indicated by circles and unpressurized pneumatic networks are indicated by X's.
Figure 3B:
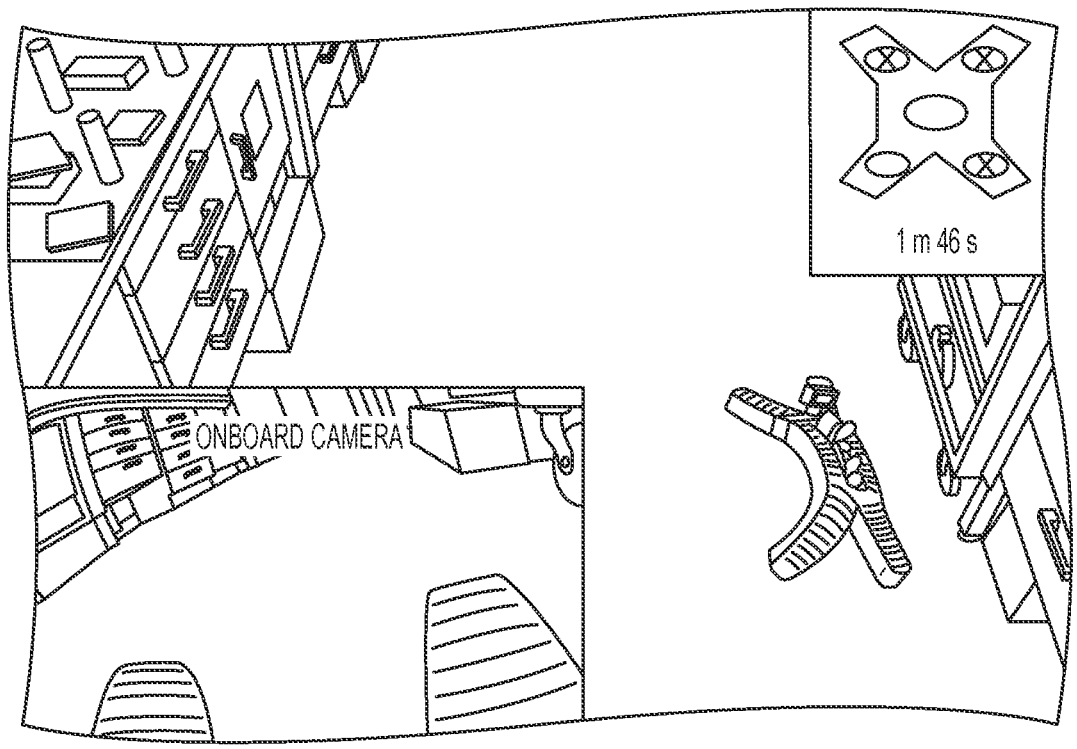
Figure 3C:
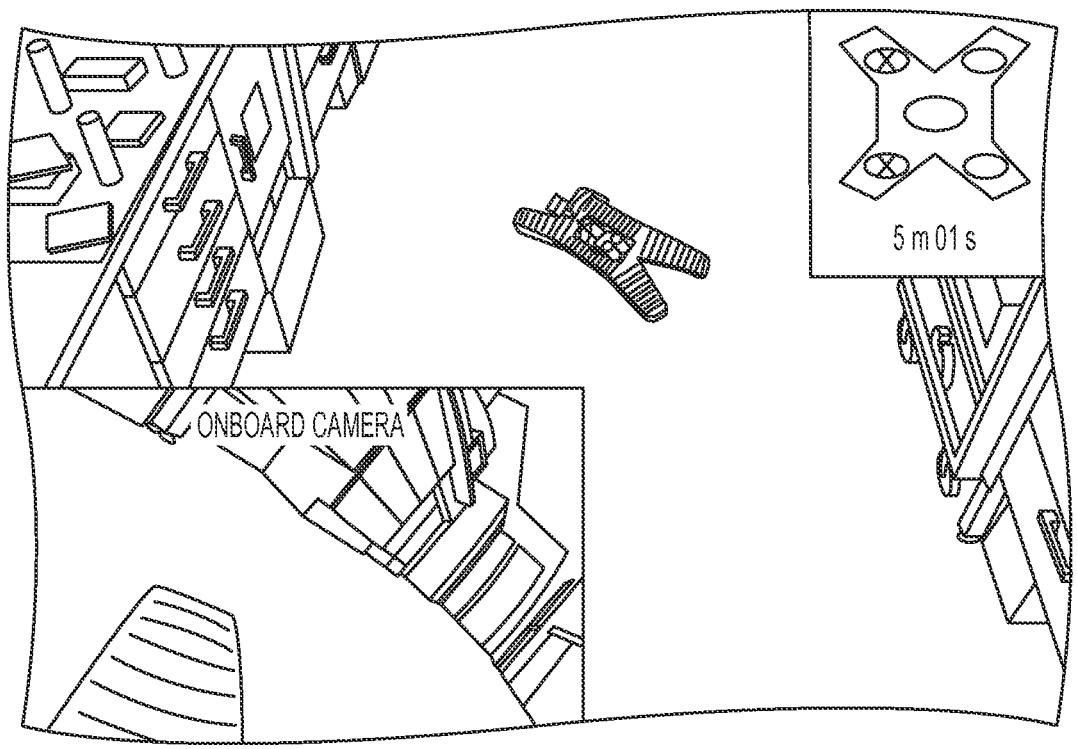
Figure 3D:
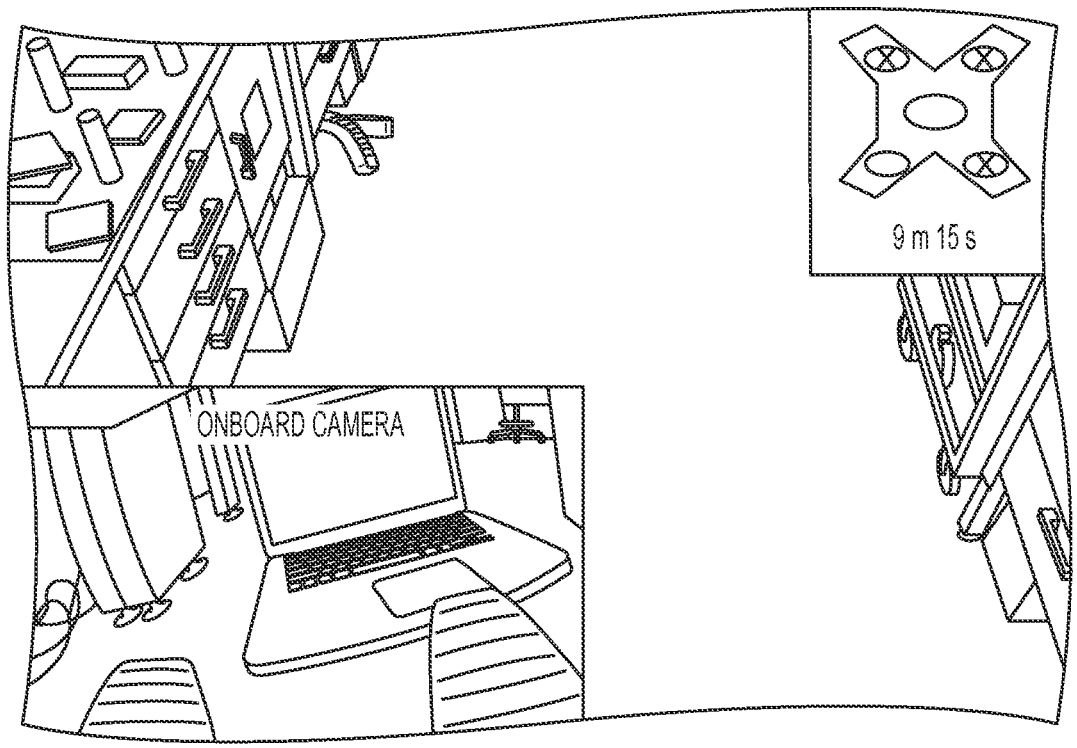
Figure 3E:
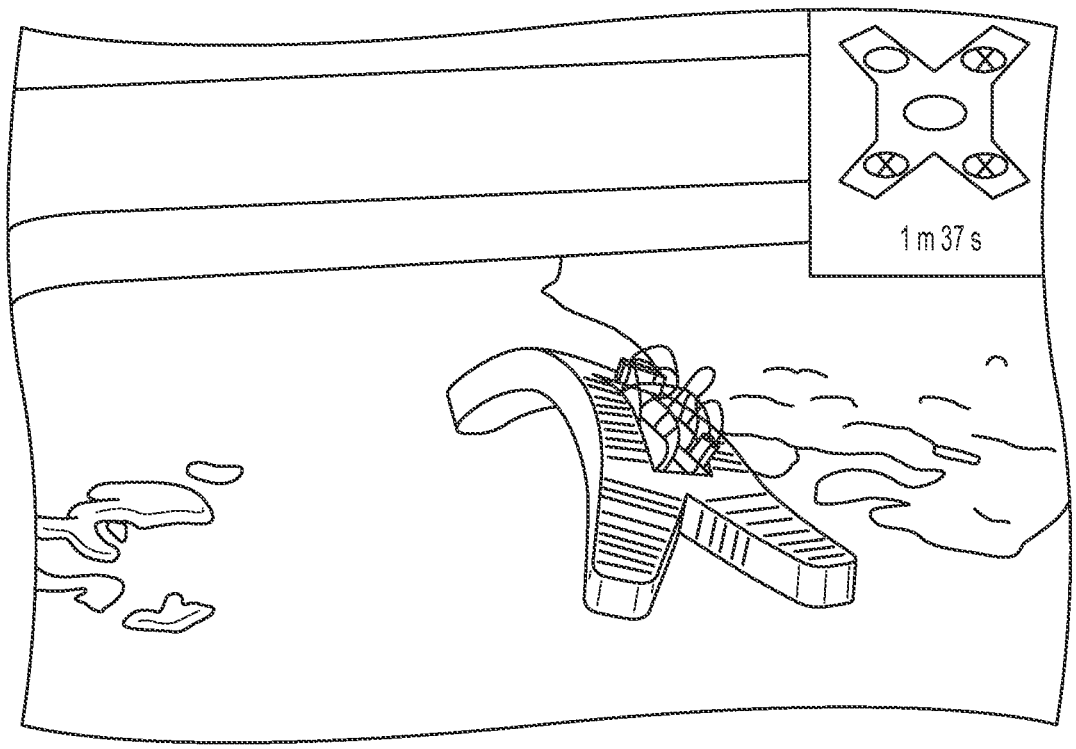
FIGS. 3E-3H demonstrate the toughness and resilience of an untethered soft robot operating outdoors before (FIG. 3E) and after (FIG. 3H) being run over by a car, in which open circles on the figures in the upper-right corner of each frame indicate which PNs are currently actuated (pressurized), circles with X's indicate unactuated PNs.
Figure 3F:
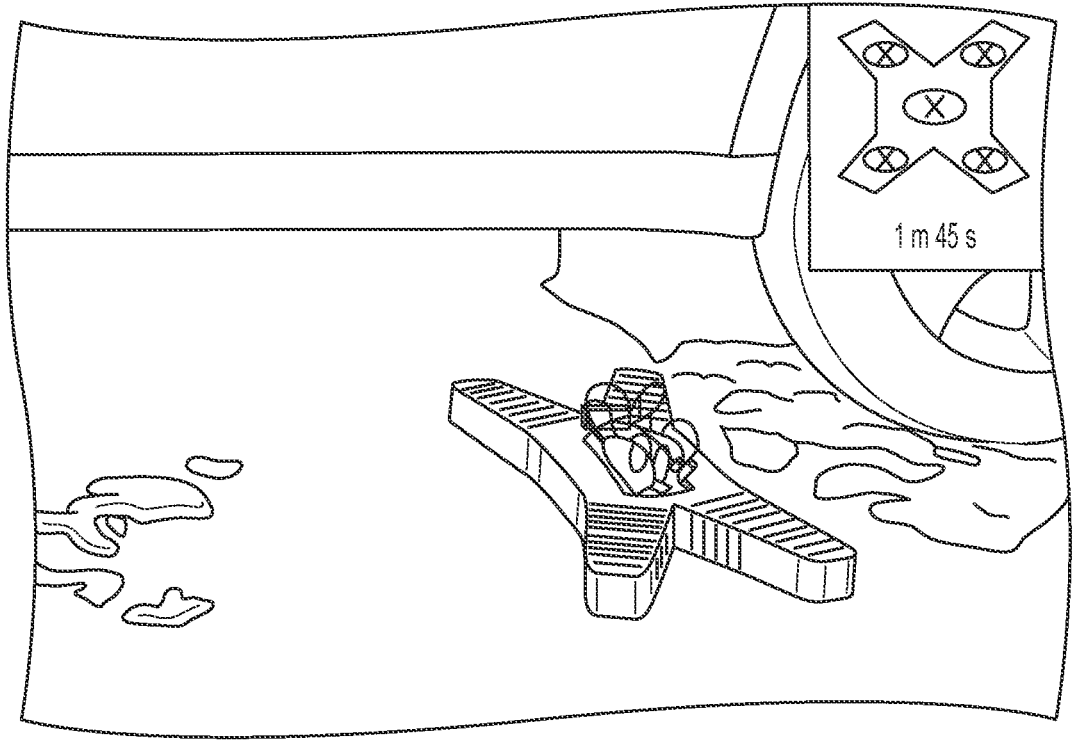
Figure 3G:
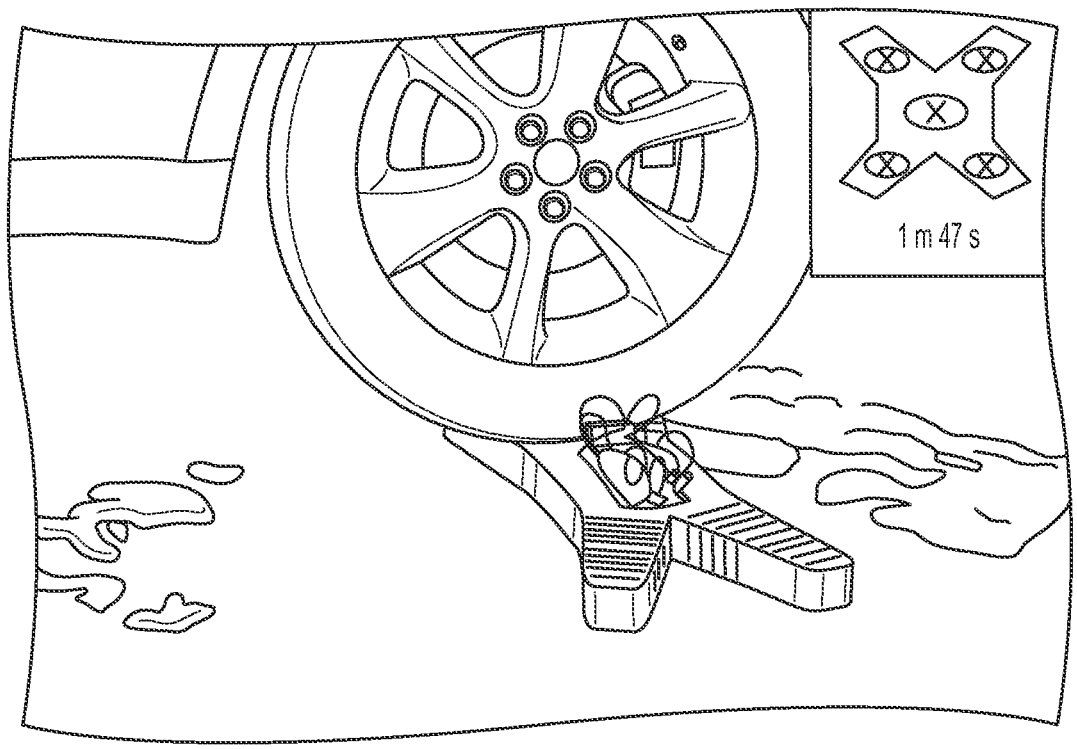
Figure 3H:
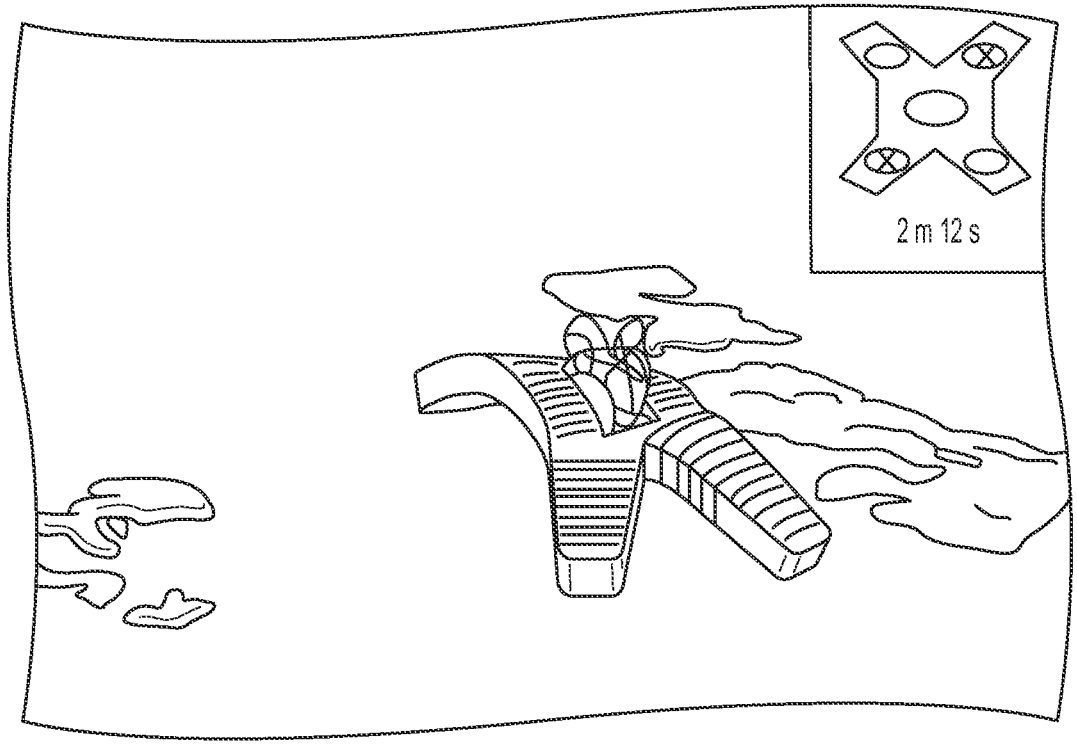

FIG. 2B illustrate the bending actuation of one or the pneumatic networks, PN1. Referring now to FIG. 2B, the interior side walls 240 of the actuators do not share a common wall, that is, they are detached or freestanding. Similarly, the top exterior walls 250 are separate from one another. In contrast, the external side walls 260 are joined together and form a common communal wall. Because the interior side walls are freestanding, they are more compliant than the exterior walls. Therefore, an increase in the internal pressure preferentially expands the inside walls and minimizes the strain that occurs on the other exterior walls. In addition, the close proximity of two neighboring chambers causes the expanding inside walls to push against each other (shown by arrow in FIG. 2B), and results in a preferential elongation of the extensible layer, with only small changes (<1%) in the height of this layer. This results in rapid actuation at low pressures. When the pressure is removed and the pneumatic network returns to its resting state, the connected external side wall serve as a restoring force to return the expanded actuator to its initial resting state.

The soft robot also includes a reservoir 265 for housing a source of on-board compressed air 230. In one or more embodiment the compressed air can be an electrically operated miniature air compressors (MACs) or compressed air. Compressed gases provide higher flow rates, but for shorter durations than mini air compressors. For applications such as search and rescue, electrically powered mini air compressors are suitable. A benefit of on-board air compressors is that they can be operated interchangeably either tethered (with thin, light-weight, and flexible electric wires) or autonomously (for up to two hours via battery with the tether detached).

In one or more embodiments, the soft robot includes two on-board electrical air compressors 270, 275. An air compressor uses energy, usually electrical energy, to compress atmospheric air, which can be released to pressurize the actuators. The soft robot can have one or more air compressors mounted on the device. The soft robot can also include a battery 280, 285 for operating the compressor. Instead of, or in addition to, the battery, the soft robot can include a lightweight electric line from an off board power source (not shown) to power the air compressors. The electrical wiring is lighter than the pressure lines and only a single line is required.

In one or more embodiments, the soft robots are equipped with two-way valves (not shown) for the control of air pressure into the pneumatic networks of the soft robot. The soft robot can also include a control system that controls the timing and sequence of operation of the two way valves and operation of the air compressors.

In other embodiments, the soft robot can also carry a load. The features described herein, including but not limited to, the reduced robot weight due to the use of a composite actuator and tougher elastomeric pneumatic networks, provide a load bearing robot capable of carrying a load that is significantly greater than previously known soft robots. In one or more embodiments, the soft robot is capable of carrying loads that represent more than 10% of the total mass of the robot, or more than 20%, or more than 30% or more than 40% or more than 50% of the total mass of the robot. The soft robot also can carry a load in a range bounded by any of the values stated hereinabove.

In one or more embodiments, the load includes an on-board actuation device. As noted above, mobility of soft robots can be limited by the need to tether the robot to an off-board actuation device. The stronger, light-weight soft robots described herein are capable of carrying an on-board actuator, allowing the robot greater freedom of operation. Use of an on-board miniature air compressor is disclosed hereinabove; however, other on-board actuators are also contemplated. For example, explosive actuation devices and on-board chemical actuators, such as those disclosed in PCT/US2012/59226, filed Oct. 8, 2012 and hereby incorporated its entirety by reference, and hydraulic actuators can be accommodated as a load.

In other embodiments, the load can include on-board sensors and communication systems that allow the soft robot to perform operations and communicate with the operator, including the wireless transmission of information and data obtained during robot operation. For example, the soft robot can include sensors, audio and visual monitoring devices and communication and other information transmission capabilities. In one or more embodiments, the systems include one or more of inertial measurement units, a global positioning system, biological and chemical sensors, thermal sensors, thermal imaging, optical imaging, radio frequency receivers and transmitters, a data encryption unit, a laser range finder, ground-penetrating radar, ground-penetrating sonar, beacons, spectrometers, microphones, and radiological sensors.

In other embodiments, the load can also include an on-board power source to operate the actuation device and/or any of the ancillary devices included as a load. In one or more embodiments, the power source can be a battery, e.g., a chemical battery, radioactive decay battery, fuel cell, photovoltaic systems, as well as gas, liquid or solid fuels.

The soft robots as described herein are capable of carrying a load that is a significant percentage of the total robot mass. In addition, the soft robots are lightweight, without loss of strength. Soft robots as described herein also show improved actuation and restoration of position, allowing better accuracy in actuator position. Such features are useful in a variety of applications. For example, lightweight, high strength robots that are capable of load bearing find use as rescue robots (e.g., tethering a hose to the robot that dispenses water or firefighting foam, incorporating systems for the delivery of medicine to injured persons in remote or dangerous areas, incorporating medical diagnostic equipment) sample collection equipment and associated storage containers for collected samples (useful for example, to geologists, NASA, and UN weapons inspectors), for defensive or offensive weapons (e.g., using the robot to deliver a bomb to a target, depositing land mines, disabling land mines, delivering thermite to support elements in key infrastructure, incorporating a gun). In one or more embodiments, the soft robot can include a protective layer, for example armor plating (like a turtle's shell) or a covering for the electronics to impart environmental resistance (e.g. water resistance or radiation resistance). In other applications, the robot can include hollow channels in the robot for running electrical wires throughout the body of the robot. This would enable the incorporation of electrical systems throughout the body of the soft robot. A visual display and speakers can also be included for human interaction.

While the invention is illustrated with reference to pneumatic actuation, it is recognized that the actuation can be any fluid actuation. The actuation can be, for example, hydraulic actuation or other fluidic actuation.

The invention is illustrated in the following examples, which are not intended to be limiting of the invention.

EXAMPLES

A quadrupedal soft robot ~0.65 meters in length was fabricated that can be driven for two hours on a flat surface using a battery pack (3,200 mAh, lithium/polymer; E-flite) at speeds of >18.0 m hr-1 in a walking gait, and >2.0 m hr-1 in an undulating gait. Four characteristics were incorporated into an untethered soft robot that is resilient to a variety of environmental conditions. The robot included (i) a higher strength (and lower density) composite elastomeric material for the body, so that the robot could operate at higher pneumatic pressures; (ii) a larger body size to accommodate and support the power source; iii) employed a modified pneumatic network (PN) architecture, more rapid and stable actuation than our previous pneumatic network design; and (iv) an electrically powered on-board air compressor, a system of valves, and a controller for pneumatic actuation.

To carry the increased load of the pneumatic pumps and control electronics, as well as a body larger than that of our prior quadrupedal robots, a high elastic modulus silicone (~7.0 MPa or 1,015 psi; M4601, Wacker Chemicals) with similar extensibility (~700% strain to failure) was used. The higher modulus silicone permitted actuation with higher pressures than the silicone elastomer used previously (~0.11 MPa or 16 psi; Ecoflex 0030, Smooth-On). The stress-strain behavior of both materials is reported in FIG. 1B. In addition, the stress-strain behavior of M4601 silicon composites with hollow glass spheres and polyaramid fabric is also reported in FIG. 1B.

The weight of the robot's body was reduced by ~40% relative to the unmodified robot body by incorporating hollow glass spheres into the silicone. The addition of the glass spheres reduced the extensibility of the material (to ~400% strain to failure), but this reduction did not compromise the operation of the robot due to the improved mechanical design of the actuators.

Figure 7A:
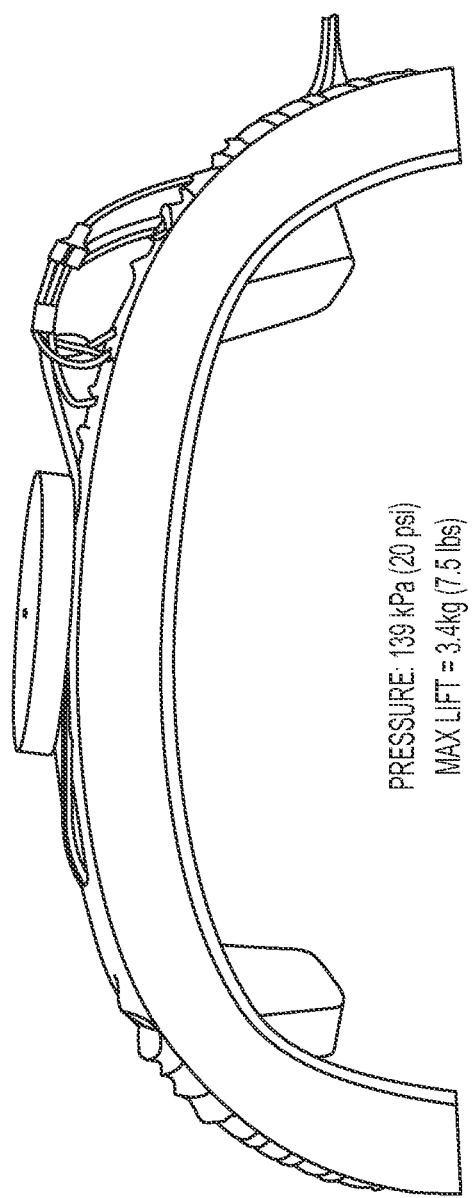
FIG. 7A shows the maximum lift test, in which starting from a flat position, a tethered version of the soft robot was able to lift a mass of 3.4 kg (7.5 lbs) when actuated with a pneumatic pressure of 139 kPa (20 psi).

The mass of the electrical components is 1.2 kg (2.6 lbs). Assuming a payload of ~5 lbs, the robots body should be able to lift hold 3.4 kg (7.5 lbs) mass (as in FIG. 7A). Extension at the top layer is defined relative to the bottom layer assuming the legs are actuated to form a circular arc (probably the limiting case for an untethered soft robot). The ratio of extension of the top layer material vs. the bottom layer is given by MaxStrain=t/R where t is the thickness of the robot and R is the radius of curvature of the leg when fully actuated. For this prototype, t=55 mm and R=127.3 mm, thus MaxStrain=0.43 (or 43%). Thus, the material was able to strain at least 43% without failure under a pressure that can be reasonably be contained with silicone fabrication techniques (ca. 16 to 20 psi).

Power Source

Compressed gas can be used to power the pneumatic soft robot. Assuming isothermal expansion at temperature T (i.e., the process is slow enough for energy from the environment to heat the expanding gas), the maximum work w that can be done by n moles of gas at a working pressure, $p_w$, expanding to atmospheric pressure, $p_{atm}$, is given by Equation 1, where R is the Boltzmann constant.

$$w = nRT \ln \frac{p_w}{p_{atm}} \quad \text{(Equation 1)}$$

For a working pressure of 16 psig (214 kPa), at 20° C., a mole of compressed gas has the potential to do 1.83 kJ of work. Compressed air at the commonly available pressure of 2,900 psig (20 MPa) and 20° C. has a molar volume of 8.04 kmol/m$^3$. Pressurized carbon dioxide, however, is commonly at 850 psig (5.9 MPa), and has a molar volume of 17.8 kmol/m$^3$. Thus, the energy density of commonly available liquid $CO_2$ is approximately 2.2 times that of gaseous compressed air. Due to this higher volumetric energy density, $CO_2$ (1) is an attractive source for compressed gas.

Using the Hagen-Pouiselle relationship (Equation 2) between pressure difference, ΔP, initial flow rate of gas into a Pneumatic network volume, Q, the gas delivery tube length, L, and radius, r, the theoretical flow rate for compressed gas from commercially available $CO_2$ cylinders can be calculated. For compressed $CO_2$ regulated to 16 psig (214 kPa) flowing through a 1 m tube with a 2.5 mm radius, the initial flow rate is 0.12 m$^3$/s. However, this value will drop rapidly as the actuator begins to pressurize. The available volume of gas from a cylinder capable of holding 44 grams of liquid $CO_2$ (a size compatible with our larger robot design) is ~10.5 L at the working pressure.

$$\Delta P = \frac{8 \mu L Q}{\pi r^4} \quad \text{(Equation 2)}$$

Mini air compressors (MACs) are relatively light weight (<0.5 kg) diaphragm pumps driven by electrical motors. They can be operated by electrical wire from a remote location, tethered operation, or via battery in untethered operation. While tethered (using thin/light copper wires), the robot can be actuated indefinitely. Two motors powered via a 3,200 mAh lithium-polymer (Li—Po; ~0.5 kg) can operate continuously for 1.6 hours (the motors draw ~1,000 mA of current each). However, the mini air compressors have limited flow rates: a maximum of 11 L/min (1.8×10$^{-4}$ m$^3$/s) unrestricted, or 2 L/min (3.3×10-5 m$^3$/s) at 16 psig (214 kPa). Thus, over 1.6 hours, the volume of gas at the working pressure that the compressors deliver is at least 192 L.

Though the initial flow rate of gas into a pneumatic network provided by the MACs is lower than for compressed gas cylinders, the overall volume of gas available for actuation is much greater (192 L vs. 10.5 L). In any case, flow rates quickly become limited by back pressure in the pressurized pneumatic network. An attractive feature of MACs is the potential for both tethered and untethered operation. Suitable air compressors include those commercially available from BTC IIS, Parker Systems having a weight (0.34 kg), size (7.5 cm length), and gas flow rates (2 L/min) at the chosen working pressure. A potential advantage of compressed gas is the ability to accelerate actuation with higher working pressures.

Body Architecture and Fabrication

The body of the soft robot consists of four legs connected to a central body, each of which is actuated by a pneumatic network (FIG. 2A). In order to increase the rate of actuation of the larger untethered robot, the pneumatic network was designed to allow for actuation at low pressures and with less volumetric flow of gas into the pneumatic networks (FIG. 2B). The spine of the robot is actuated by two parallel pneumatic networks with space between them to accommodate the power supply, control board, and two air compressors.

Due to the large size of the robot (~0.65 m in length) (see FIG. 6A), molds were assembled from pieces of laser-cut sheets of 6 mm thick acrylic. Using integrated alignment features, the cut acrylic pieces were assembled into a three dimensional mold (see FIG. 6B). The modular nature of these molds greatly facilitated demolding of the cast robots, as the mold could be disassembled after curing. A water jet system was used to cut aluminum for the thinnest pieces of the mold, as they were most susceptible to fracture during demolding.

Figure 6A:
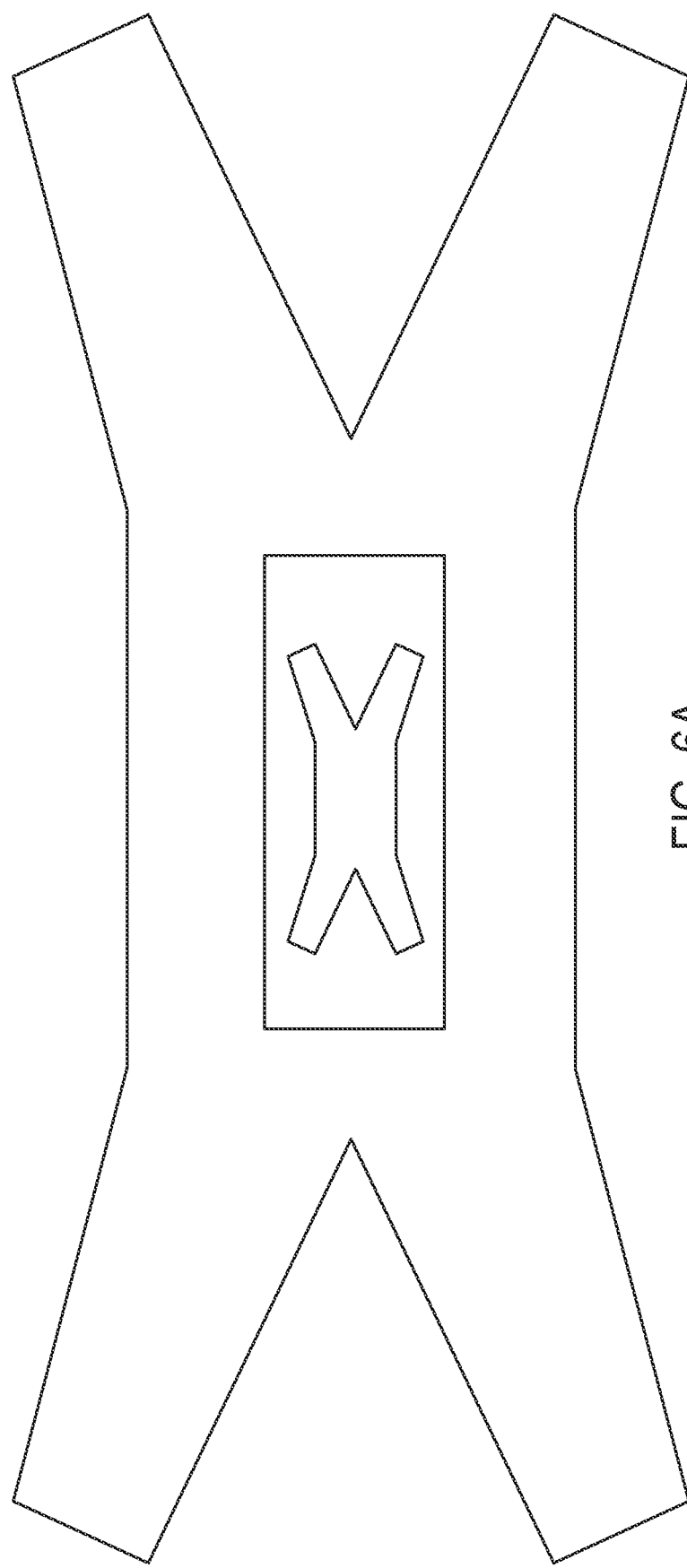
FIG. 6A shows an untethered robot design according to one or more embodiments, with the smaller tethered quadrupedal robot placed on the interior for scale. The large robot is five times longer than the small one.
Figure 6B:
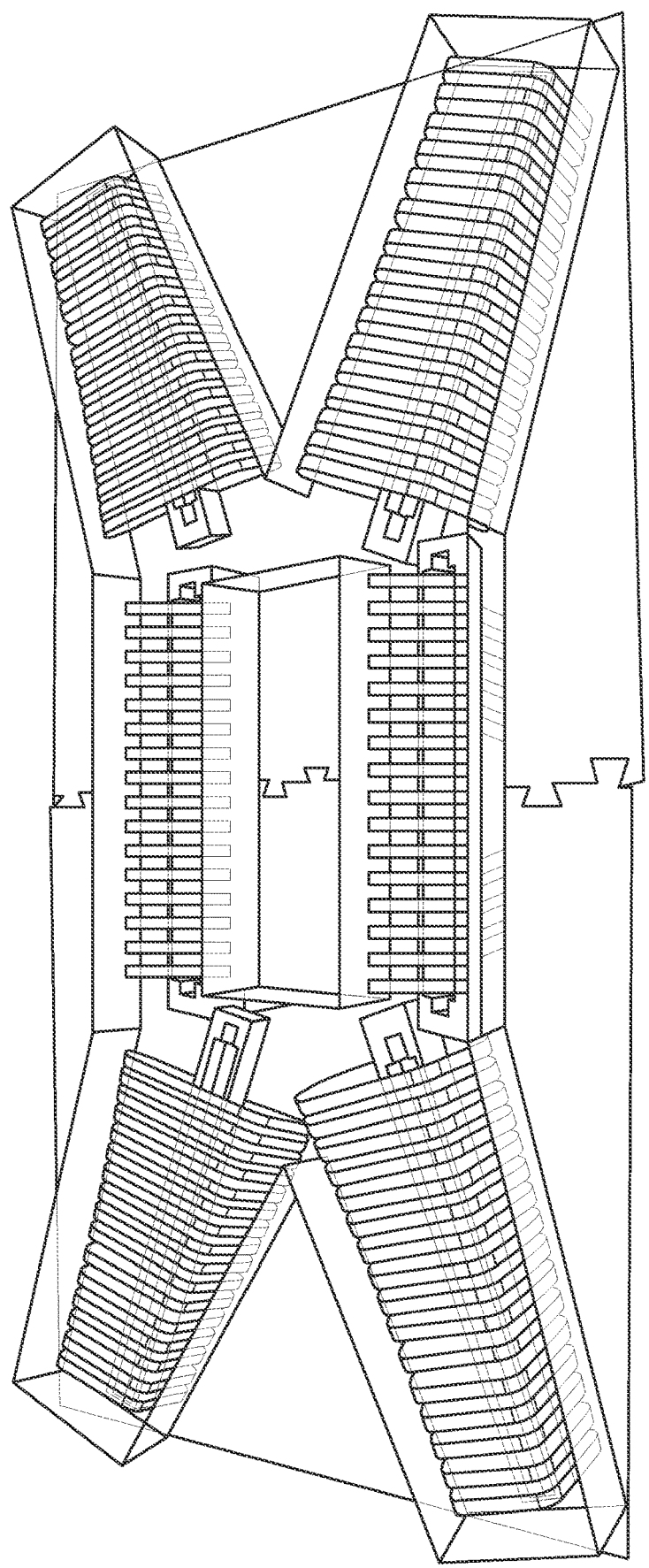
FIG. 6B shows the mold used to replicate the large quadruped, composed of laser-cut acrylic pieces.
Figure 6C:
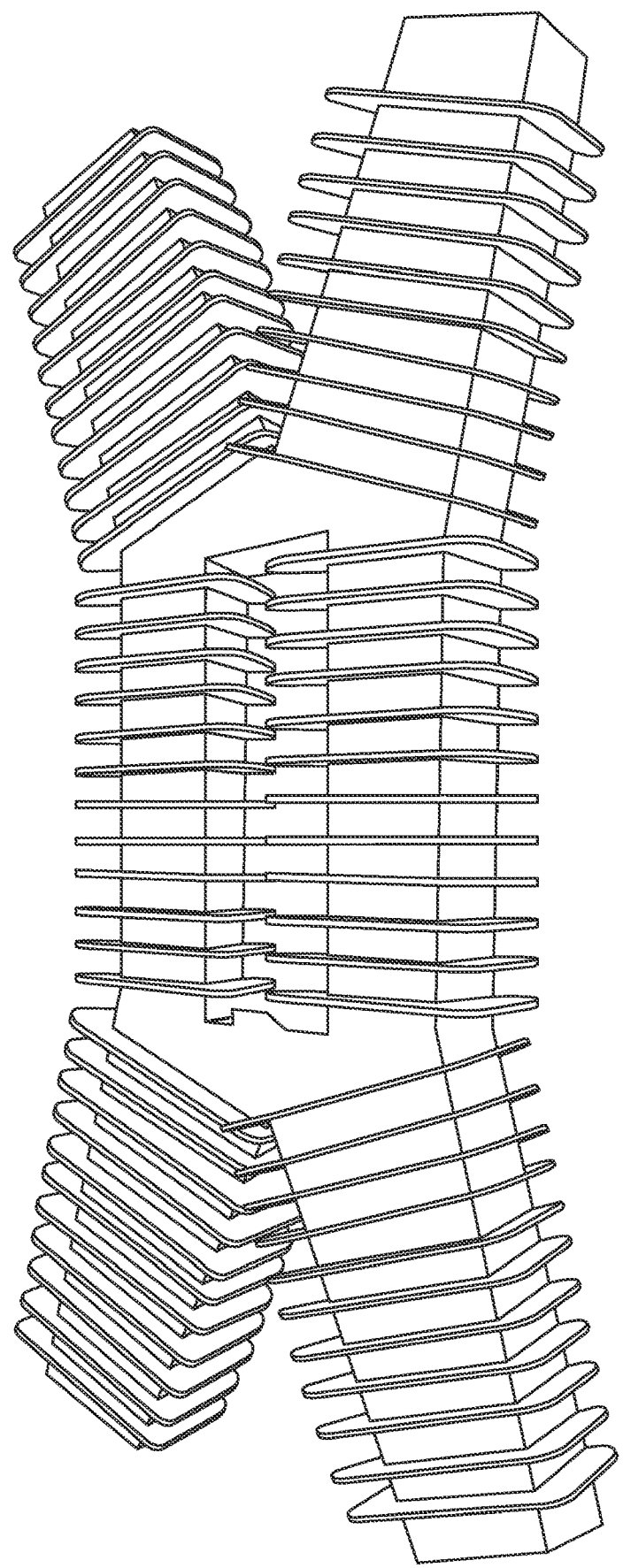
FIG. 6C shows the upper layer of robot cast in mold with waterjet-cut aluminum pieces inserted from the top (one aluminum piece removed from the lower-right leg is shown).
Figure 6D:
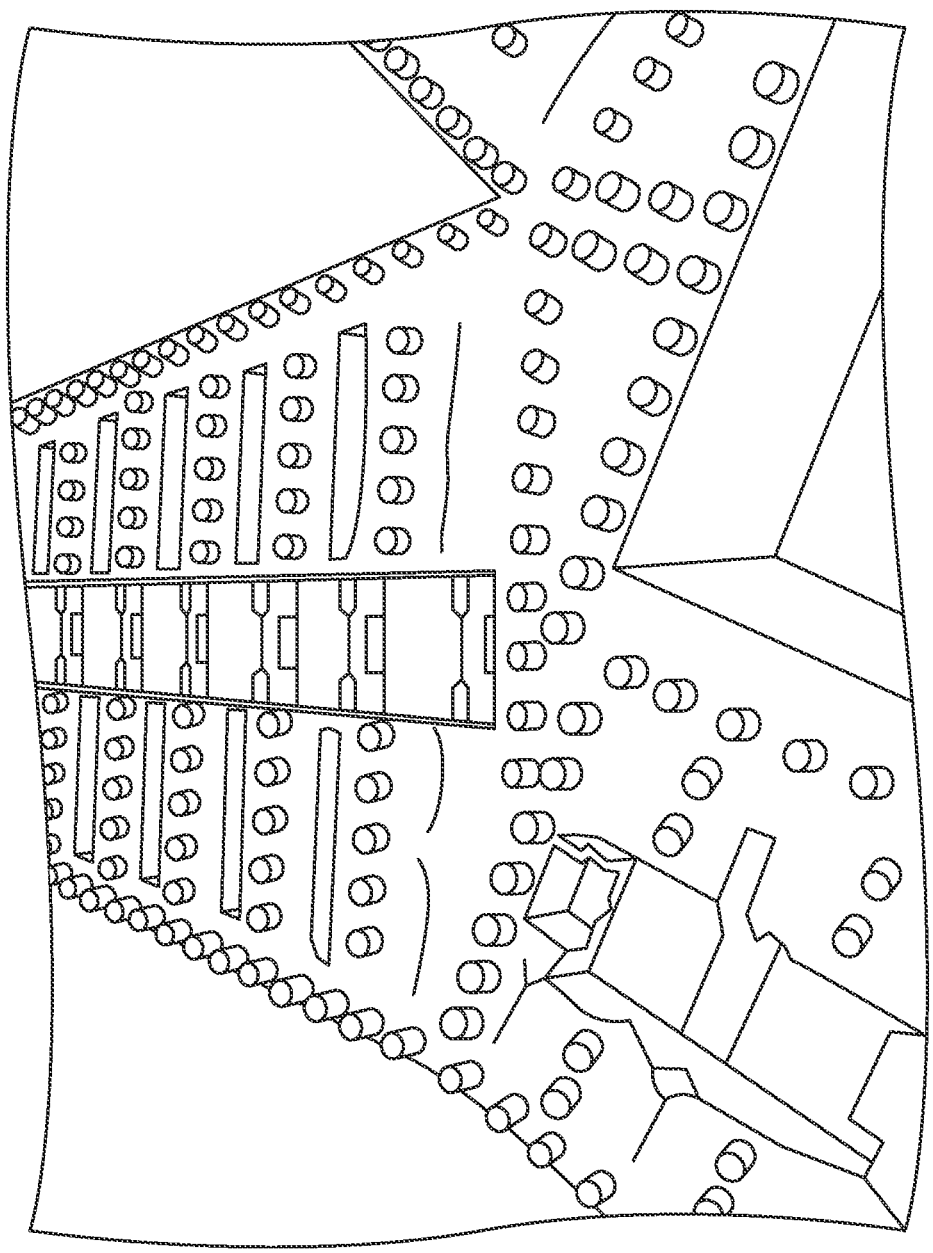
FIG. 6D shows the replicated upper layer with molded features to increase surface area and improve bonding with lower strain limiting layer.
Figure 6E:
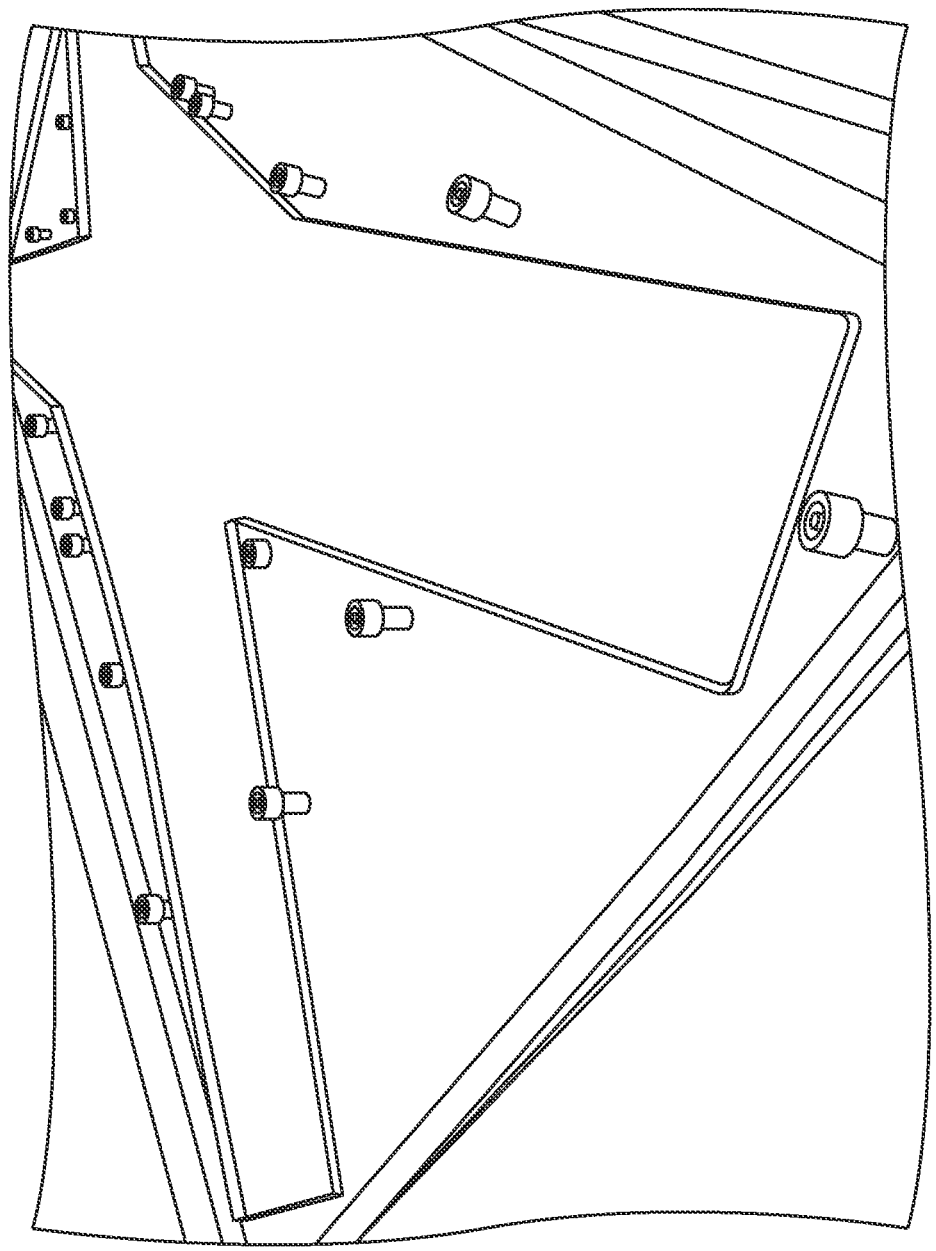
FIG. 6E shows the cut polyaramid fabric being impregnated with elastomer to form Layer 2.
Figure 6F:
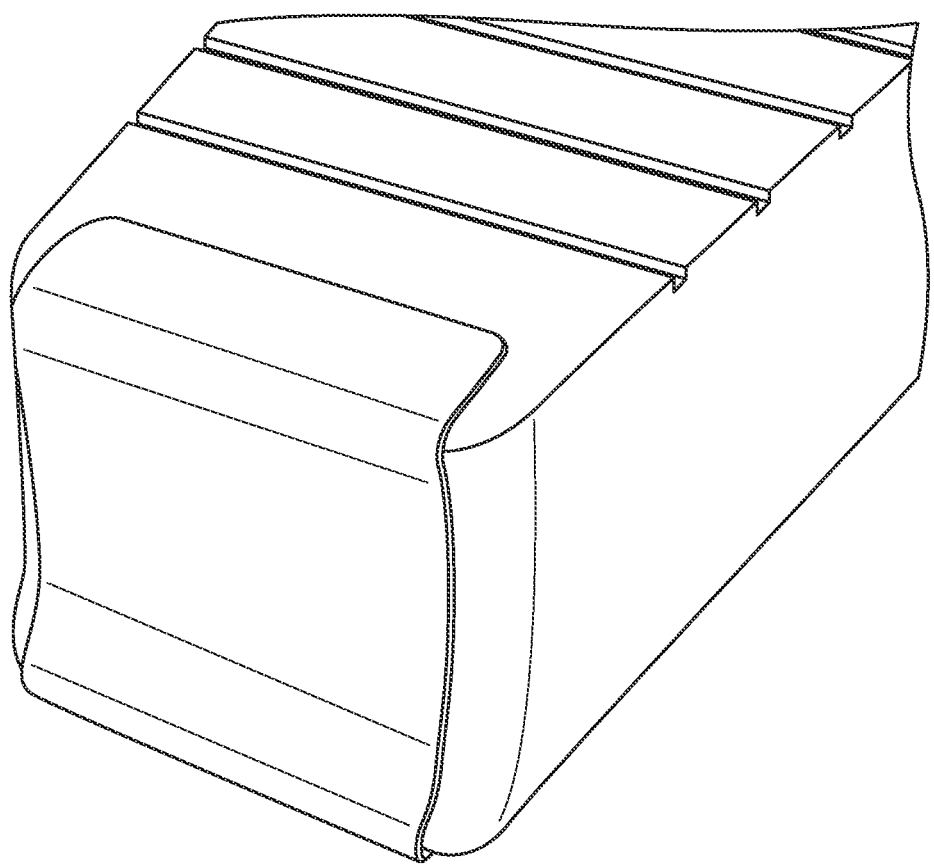
FIG. 6F shows a patch of elastomer-impregnated polyaramid fabric added to the ends of the limbs prevents undesired expansion at these locations.

To fabricate the body of the soft robot, batches of the rubber composite were prepared by blending 0.15 kg of hollow glass spheres, hgs ($\rho_{hgs}$~0.13 kg/L; Microbubbles; 3M) into 1.75 kg of M4601A silicone ($\rho_{hgs}$~1.2 kg/L) using a rotational mixer and impeller blade. After mixing for 30 minutes, M4601B catalyst was added to the mixture at a 1:9 ratio of M4601B:M4601A by weight. After mixing for another 10 minutes, the silicone was poured over the laser cut mold. FIG. 6C shows a cast top layer of the actuator after demolding. An example of the cut aluminum inserts used to define each individual chamber is shown at lower right in the figure. The mold can include raised features and/or depressions to increase the surface area between the top layer and the lower strain limiting layer. FIG. 6D shows exemplary molded raised features included in the replicated layer according to one or more embodiments. Next a composite strain limiting layer is cast or molded by embedding a reinforcing material in an elastomer layer. FIG. 6E shows a polyaramid fabric cut to shape impregnated with elastomer. The upper and lower layers are sealed together to define the pneumatic chambers. Any sealing method can be used; however, when both layers are made of silicone, a silcone precursor resin can be used as "glue". In one or more embodiments, end caps can be added to the ends of the actuator legs to provide a barrier to linear expansion. The reinforced strain limiting sheets can be used for this purpose, as is shown in FIG. 6F, where a patch of elastomer-impregnated polyaramid fabric is added to the ends of the limbs. It is also possible to mold thicker end blocks into the upper layer for the same purpose.

Foams are an option to reduce the weight of the body in one or more embodiments. In one or more embodiments, silicone foam prepolymers can be used. An accurate prediction of volume of foam expansion is needed to use foam polymers in the molding operations described herein.

Control System and Sensors

Figure 5:
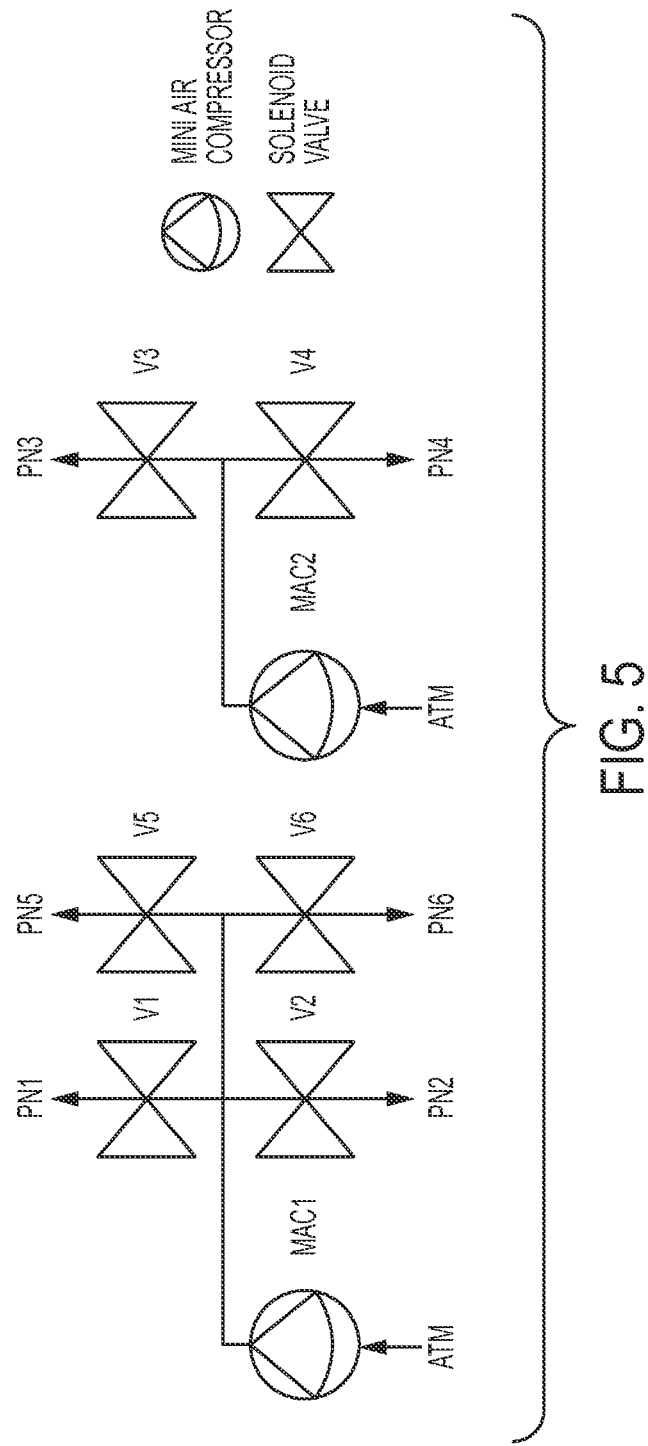
FIG. 5 is a systems diagram of the configuration of mini air compressors and valves used to drive the robot in undulation or walking gaits.

The control system of the robot consisted of a custom-built control board with outputs for two mini air compressors (MACs), and six two-way valves (X-Valve, Parker Hannifin Corporation), one for each of the six PNs that actuated the robot. FIG. 5 provides a schematic design for the valves and air compressors. The MACs provided a source of pressurized air at a constant rate, while the valves switched the connection of each pneumatic network between this elevated pressure and atmospheric pressure. One MAC supplied pneumatic networks 2 and 3, while the other MAC supplied the remaining pneumatic networks (i.e., pneumatic networks 1, 4, 5, and 6). To actuate one of the pneumatic networks, the corresponding valve was opened to connect the pneumatic network to the output of the associated MAC (as well as to any other pneumatic network currently being actuated). While a pneumatic network was not being actuated, it was by default being vented to the atmosphere. (A "hold" state was unnecessary for the patterns of pressurization and depressurization we used for actuation of the quadruped). Using a custom-designed control board allowed us to minimize the size and mass of the control system.

Control programs were stored in the onboard memory of the controller. These programs, written and uploaded using the Arduino interface, consisted of sequences of commands to the control valves and air compressors (the MACs ran at a constant voltage). The extent of actuation of a Pneumatic network was controlled by the duration the valve connecting it to the source of pressurized gas was opened.

The robot was also equipped with a light-weight camera with audio and video recording and transmission capabilities (GoPro Hero2, Woodman Labs) as sensor when audio and visual observations were required.

Scaling Considerations

Soft lithography is a scalable molding process. The robot described here has a length of ~65 cm (FIG. 6A). With all relative dimensions kept constant, as the length, L, of the robot increases, the weight of the robot increases as $L^3$, and the force the actuators apply at the same $\Delta P$ increases as $L^2$ (pressure over the internal surface area of the Pneumatic networks). Consequently, for a particular actuating pressure, the robot will eventually become too heavy to support its own weight, much less any additional load necessary for untethered operation. Thus, for larger robots, the density should be reduced and/or their actuation pressure increased (to achieve greater actuating forces).

Low Density, High Modulus Silicone Composite

The material system selected for the actuating layer was low density (0.6 g/cc), high modulus (7 MPa), resilient (<10% loss in stored energy during cycling); tough (270 MJ/cm3; and still relatively extensible (400% strain to failure). See, FIG. 1B.

Figure 1B:
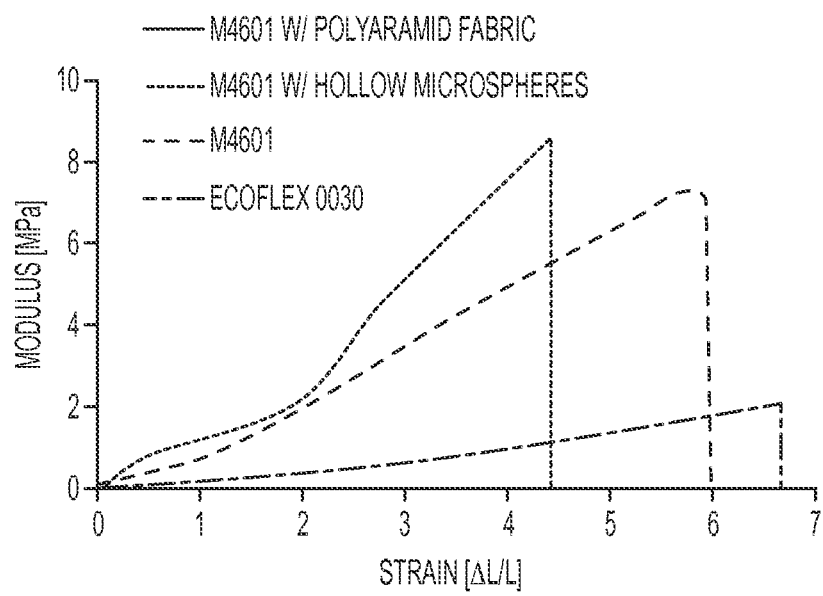
FIG. 1B shows stress strain curves for the material comprising the top (glass bubbled M4601) and bottom layers (Nylon mesh w/M4601), as well as pure M4601 and Ecoflex 0030, for comparison.

In order to prevent tears and bursting through the strain-limiting layer, a polyaramid fabric was impregnated with M4601 silicone and the composite sheet was glued to the actuating layer using a thin (<100 μm) layer of adhesive silicone sealant (Elastosil E 951; Wacker Chemical Corp.) spread between both layers. In addition, to promote adhesion between layers, pegs were added to the bottom of the top layer; these pegs increased the surface area for bonding (FIG. 6D). The relative material properties of this sheet are shown in FIG. 1B.

Material choices and methods of assembly resulted in a robot that is resilient to many harsh conditions. As an example of the durability of the robot, the robot was programmed to walk underneath a Subaru Outback wagon (details on the actuation sequence used for walking are provided below), and stop with its front legs in the path of the tires of the car. After venting all of the PNs, the wagon drove over the soft legs of the robot. Following a prepro-grammed delay, the robot stood up and continued walking with no damage from the 2,000 kg (4,500 lbs) vehicle (See, FIGS. 3E-3H).

Internal Pressure Capacity, Load Carrying Ability

The PNs that actuate the legs (1, 2, 5, and 6) were able to sustain internal pressures of ~172 kPa (25 psi) prior to rupturing. The two PNs that actuate the spine (3 and 4) ruptured at lower pressures ~(152 kPa or 22 psi), probably due to a smaller area of adhesive contact for the layers.

Figure 7B:
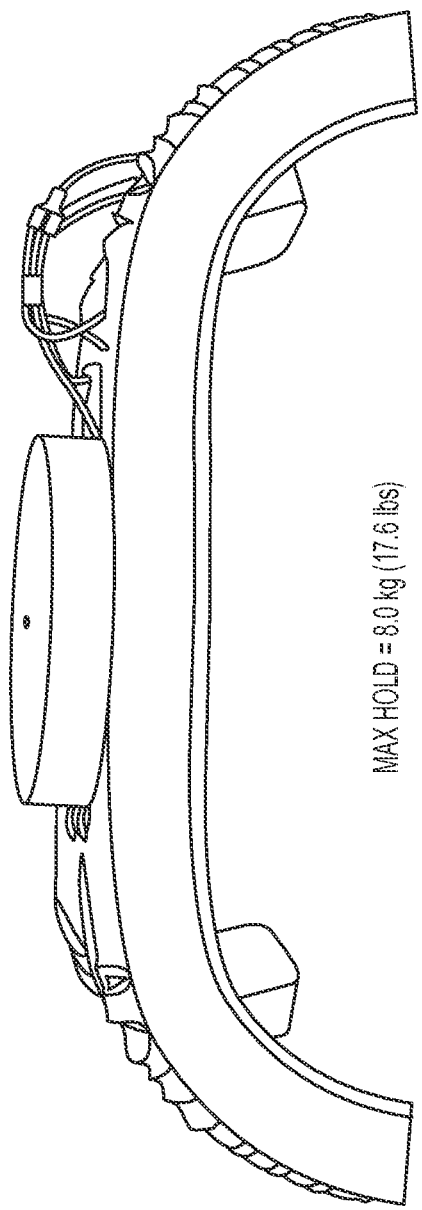
FIG. 7B shows the maximum hold test, in which starting from an actuated position with an internal pneumatic pressure of 139 kPa (20 psi), the robot was able to hold 8.0 kg (17.6 lbs).

Starting from a flat position, a tethered version of the soft robot was able to lift a mass of 3.4 kg (7.5 lbs) when the legs and spine were pressurized to just below their maximum tolerances (139 kPa, 20 psi). Subtracting the mass of the power and control components (1.2 kg, 2.6 lbs), this represents a net payload capacity of 2.2 kg (4.9 lbs), or 44% of the total mass of the untethered robot (FIG. 7).

Once the robot is in the standing position, the lower moment arm of a central mass on the legs meant that they could carry a larger load. With an internal pneumatic pressure of 139 kPa (20 psi), the robot was able to hold a mass of 8.0 kg (17.6 lbs), or 160% of the total mass of the untethered robot.

Controls for Undulating and Walking Gaits

A custom, lightweight controller board was designed to control the miniature air compressors and solenoid valves that actuate the soft robot. A microcontroller (ATmega168, Atmel Corporation) on the controller board contained an Arduino bootloader for uploading, storing, and executing programs to control the soft robot.

The robot can move using an undulating gait by actuating the pneumatic networks of the robot in sequence, which created an actuation wave that traveled through the body from the rear toward the front; this wave resulted in forward motion at a velocity of ~2.0 m hr-1 (FIGS. 8A-8F).

Figure 8A:
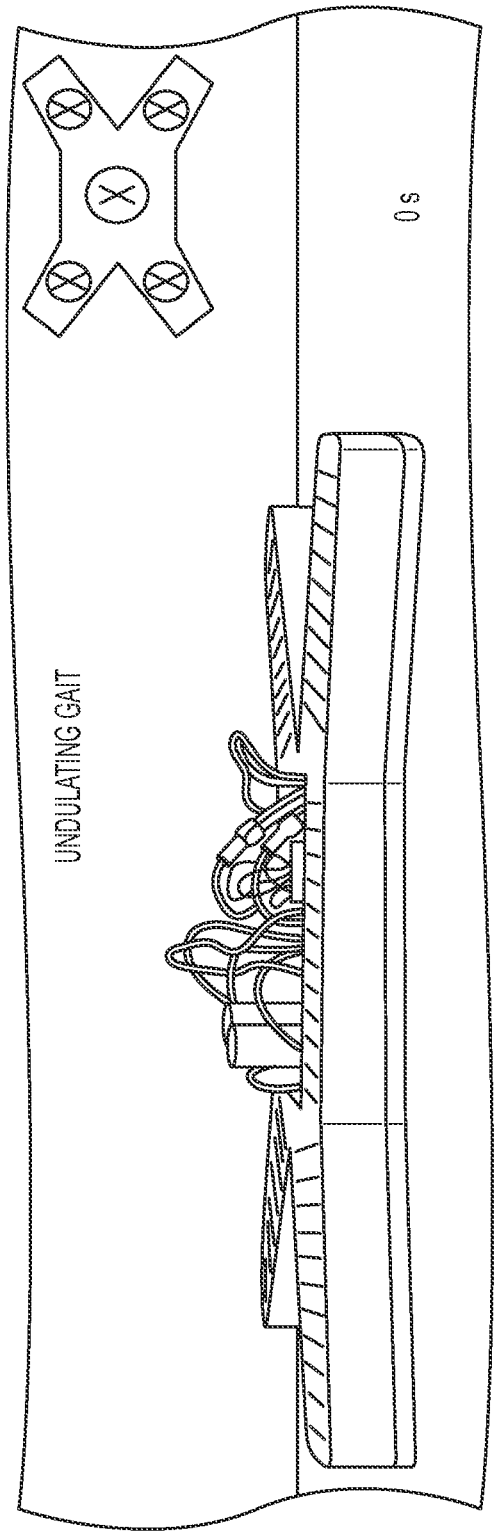
Figure 8B:
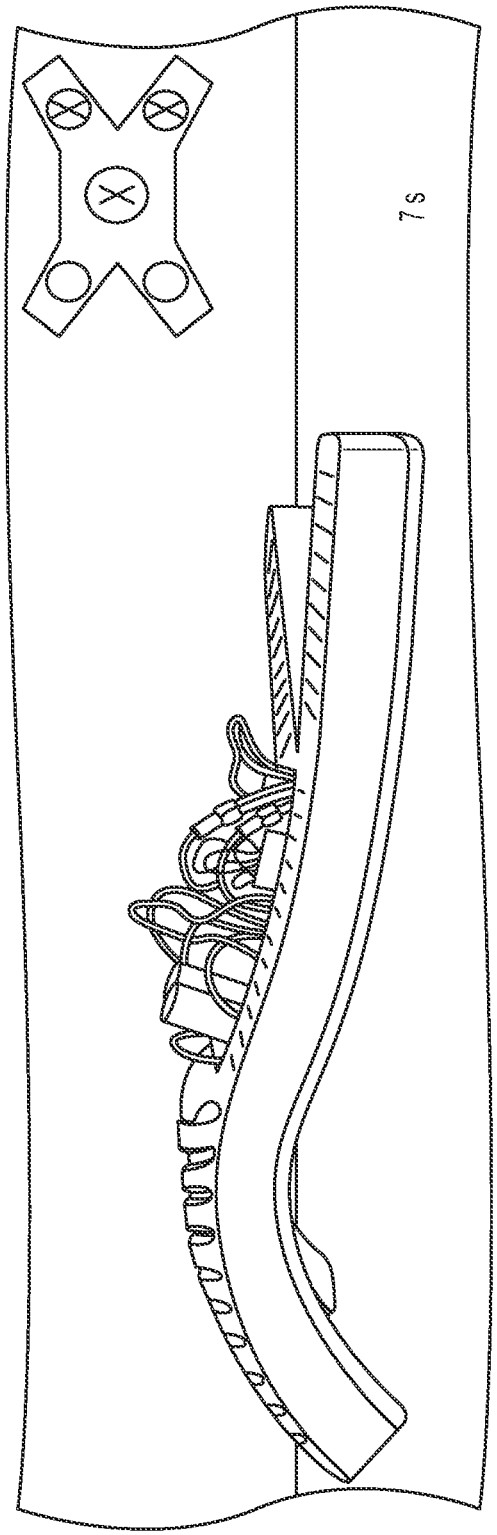
Figure 8C:
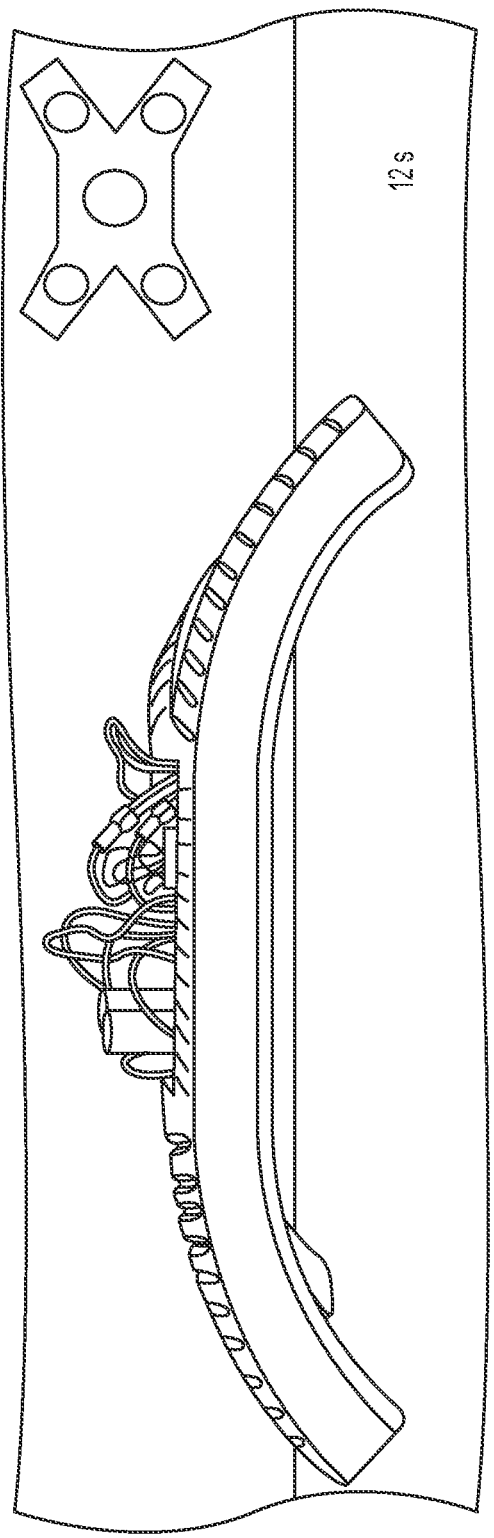
Figure 8D:
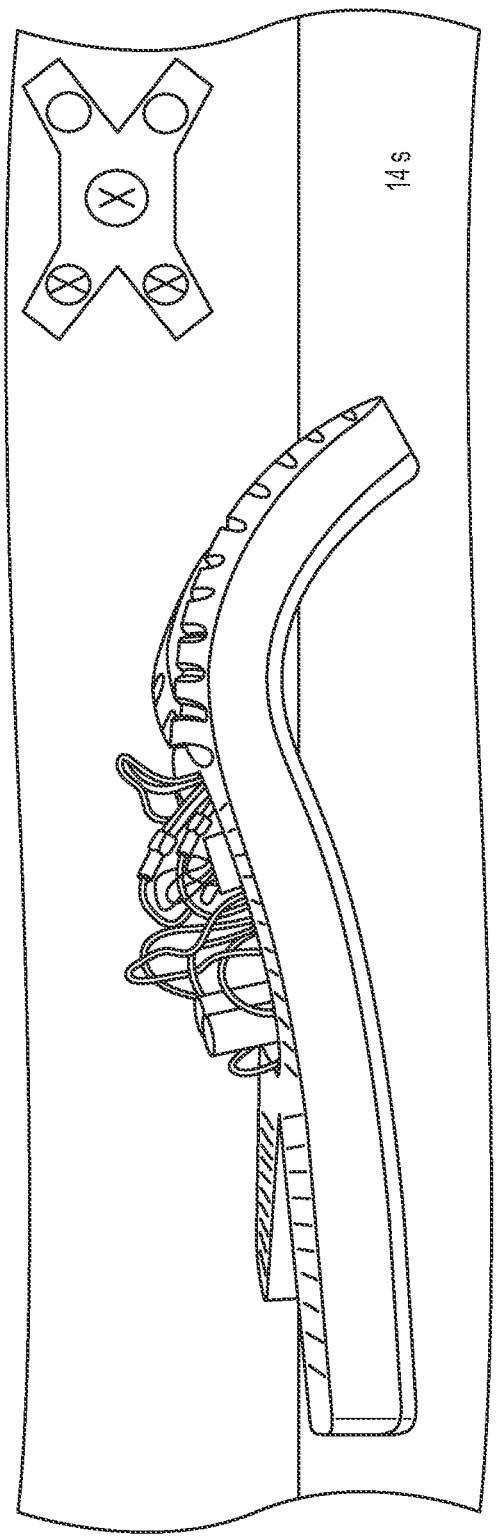
Figure 8E:
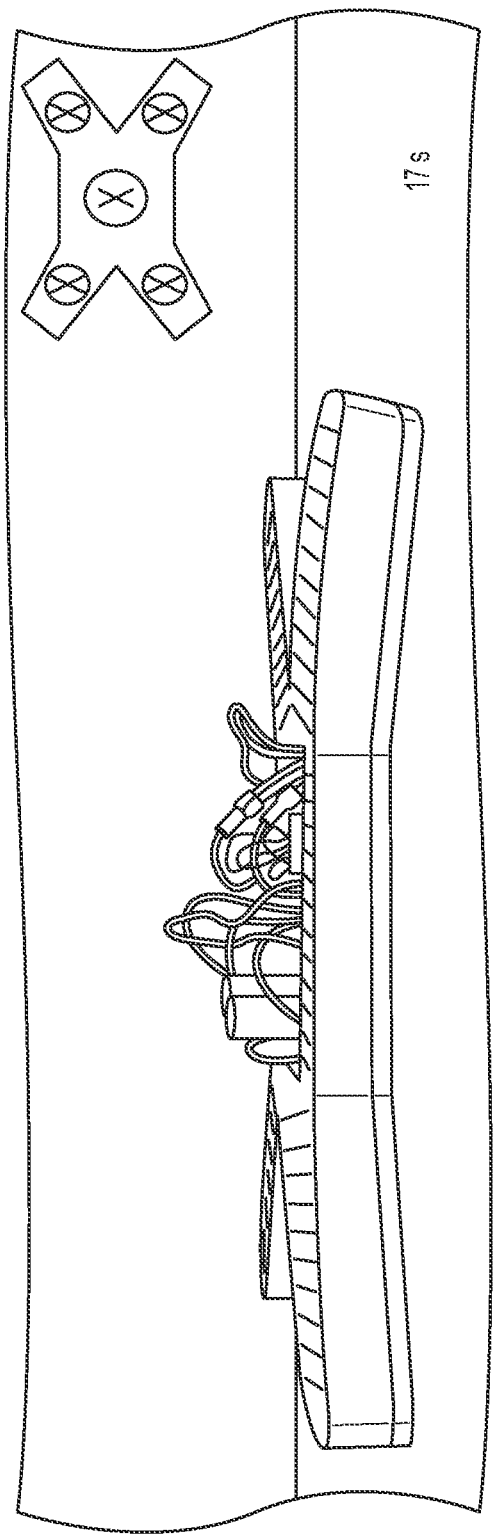
Figure 8F:
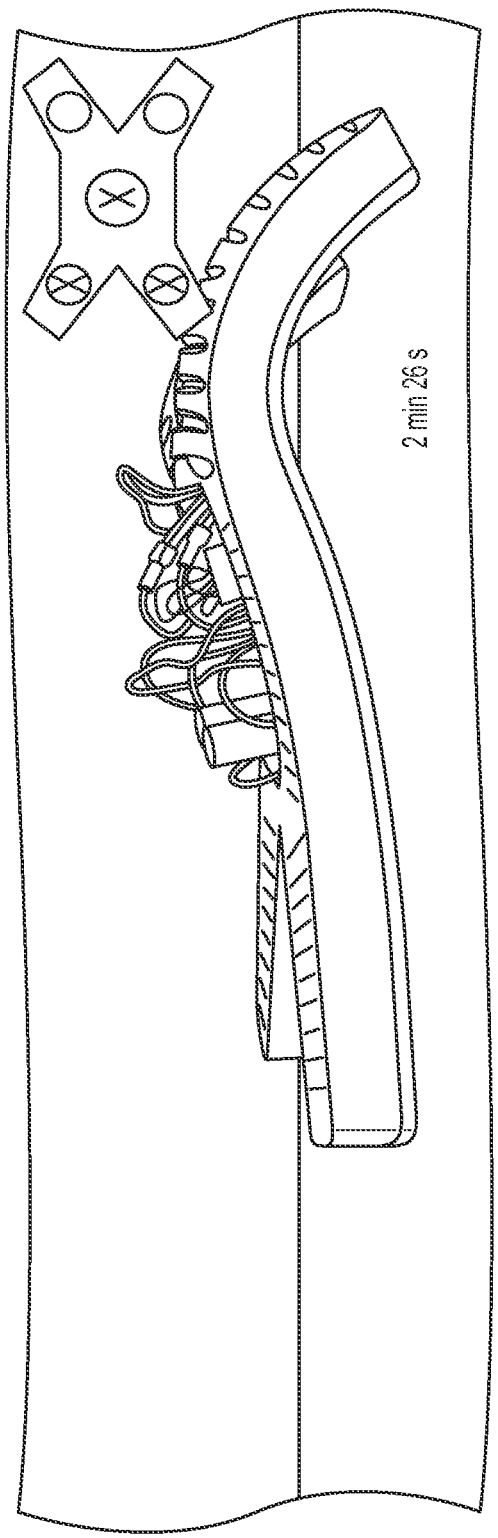
Figure 8G:
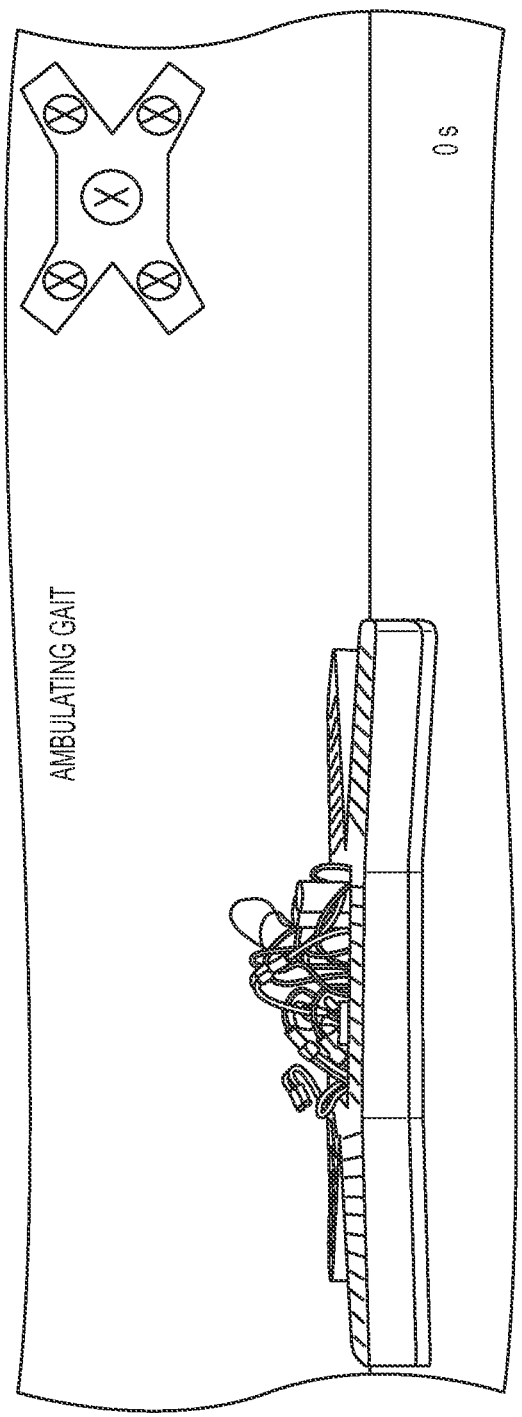
Figure 8H:
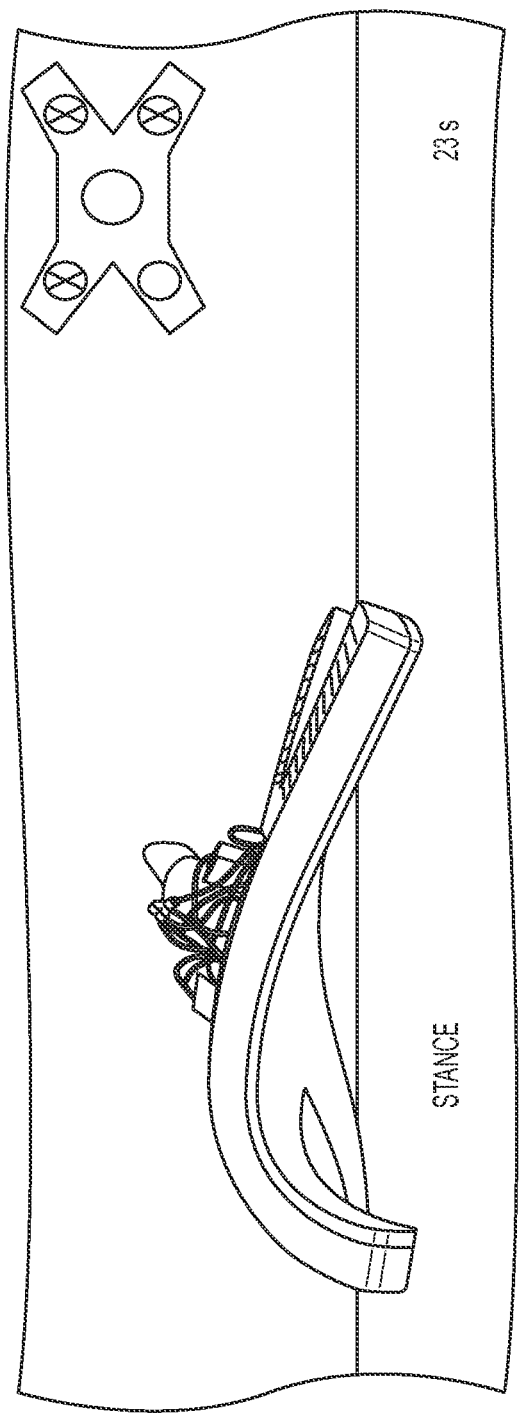
Figure 8I:
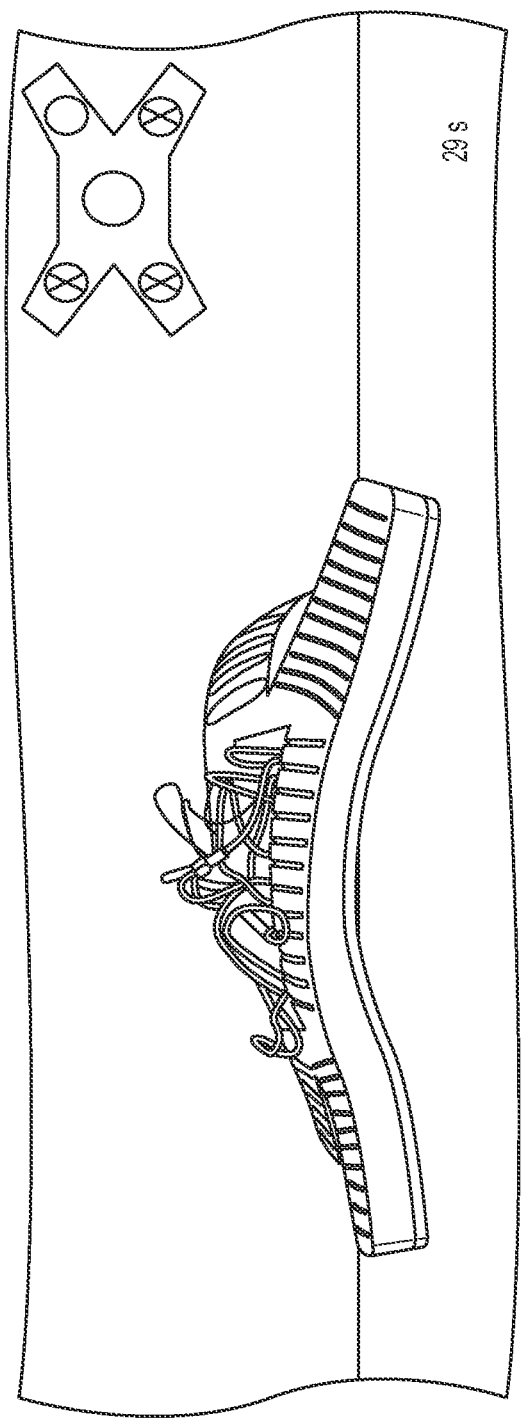

The networks being actuated are shown with time lapse indication in the upper right of FIGS. 8A-8F. The undulating gait consisted of repeated sequence of five states. 1) The rear leg PNs were actuated simultaneously for seven seconds (FIG. 8B). 2) the rear leg and body PNs were then actuated together for half a second. 3) The rear and forward legs, as well as the body PNs were all actuated simultaneously for five seconds (FIG. 8C). 4) The front legs were actuated alone for two seconds (FIG. 8D; the differential timing in actuation between the front and back legs of approximately five seconds biased the locomotion in the forward direction). 5) Finally, all of the PNs vented to atmosphere for two seconds; the MACs were also turned off for this period to facilitate venting and conserve battery power (FIG. 8E). FIG. 8F is an image taken ~2 minutes later during the fourth part of the actuation cycle (as in FIG. 8D), to show the motion of the robot due to undulation.

To command the robot in a walking gait, four actuation states were used that caused the robot to step forward first on one side, and then the other (FIG. 8G-8J). The center PNs (3 and 4) were inflated throughout the gait to arch the back of the robot. The walking gait allowed the robot to travel at a velocity of ~18.0 m hr$^{-1}$.

Figure 8J:
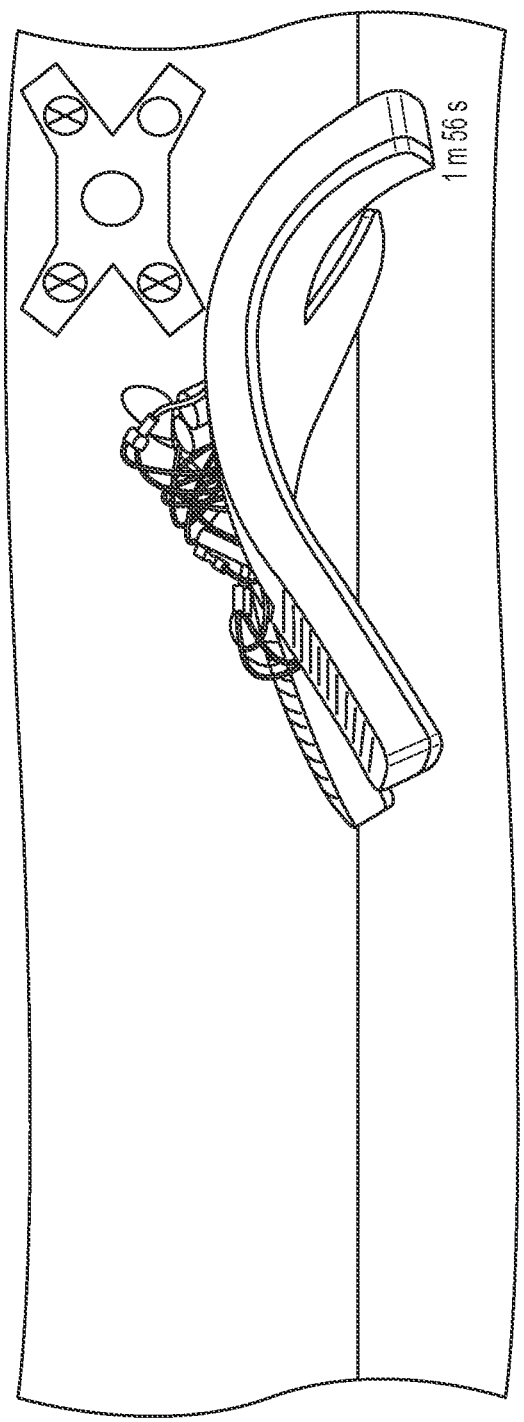

A second program, consisting of four states caused the robot to execute a walking gait. 1) Beginning with all legs in contact with the ground (FIG. 8G) (to prevent the robot from slipping backward), we caused the rear leg to actuate for four seconds, resulting in a "stance" position (FIG. 8H). 2) The actuated rear leg, as well as the front leg on the opposite side of the body, were then actuated simultaneously for four seconds to transfer both the pressurized air and the robot's weight from the rear leg to the front one (reusing pressurized air during this transfer step increased the efficiency of the robot.) 3) The robot then thrust itself forward by both depressurizing the rear leg (allowing the stored elastic energy to straighten the rear leg), while continuing to pressurize the front leg to pull the robot forward over the course of four seconds (FIG. 8I). 4) Finally, all legs depressurized for half a second to prepare the robot for the next actuation cycle. Repeating the above four steps on alternating sides of the body resulted in our walking gait. FIG. 8J is an image taken ~90 sec later to show the motion of the robot.

Remote Audio and Video Sensing: Ambulating into a Small Passageway

The robot can turn by halving the duration of actuation of PNs 2 and 5 during the walking gait. For example, in FIGS. 3A-3D, PNs 1 and 6 were actuated for half the duration of PNs 2 and 5. The result was a left turn with a radius of approximately 150 cm (a little more than two body lengths).

By strapping a forward-facing camera onto the body of the robot, we were able to perform remote audio and video sensing (here, of a laboratory, FIG. 3A-3D). For this demonstration, the information from the camera was recorded and stored on the onboard controller; the recorded audio and video were retrieved at the end of the trial.

Resilience to Harsh Environments

The material, and monolithic design, of the untethered soft robot enable it to withstand a variety of harsh environmental conditions against which traditional robots must be carefully protected.

Figure 4A:
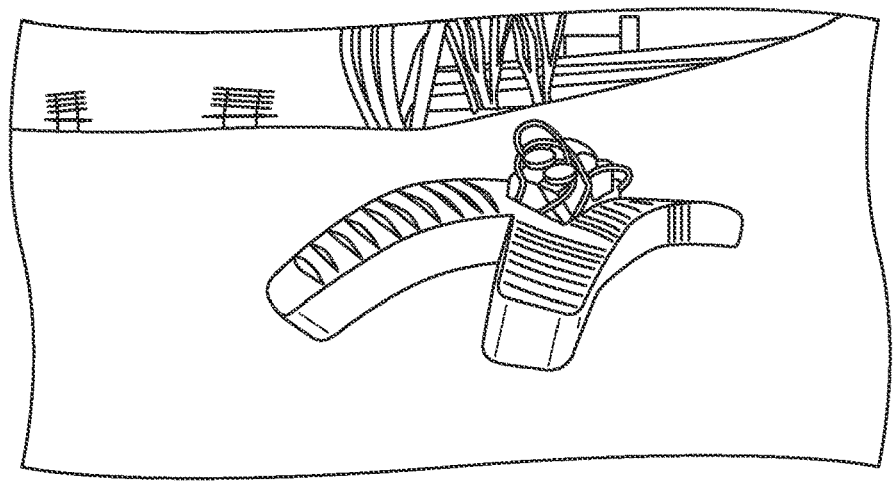
FIGS. 4A-4C demonstrate the resilience of the untethered soft robot to harsh conditions and provide images of the soft robot operating untethered in a variety of harsh conditions, including a snow storm (FIG. 4A), a fire (FIG. 4B), and water (FIG. 4C).

The robot successfully executed its walking gait outside during a snowstorm (Winter Storm Nemo) with an average temperature of −9° C. (15° F.), and average wind speed of 40 km/h (25 mph, FIG. 4A). Because of the low glass transition temperature of the robot's body material (~−120° C.), as well as the lack of sliding parts (e.g. bearings) to be contaminated, the robot ambulated normally in the snow and cold weather. Because the elastic modulus of silicone rubber is relatively constant in the range of −20° C. to 300° C. (−4° F. to 572° F.), pneumatic actuation was not impeded by the cold temperatures (although we did not develop specialized feet for travelling through snow). The robot also walked successfully in wet, slushy conditions at temperatures near 0° C. or 32° F. (FIGS. 3E-3H).

Figure 4B:
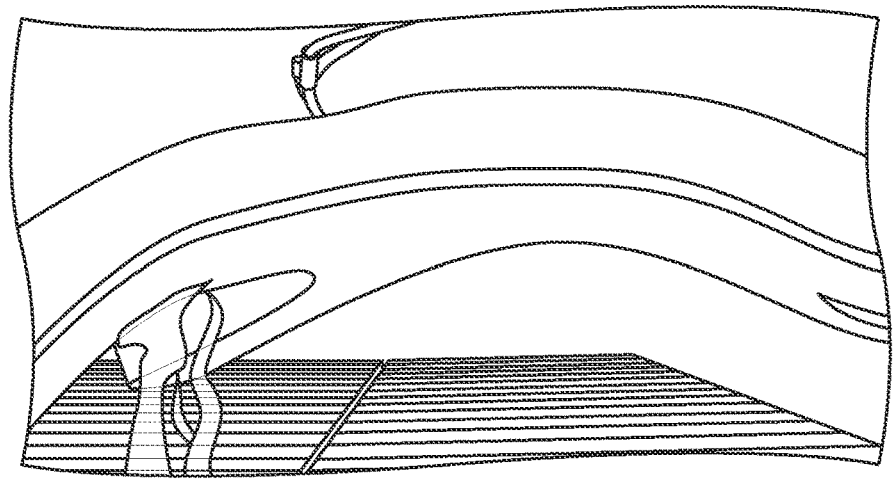
Figure 4C:
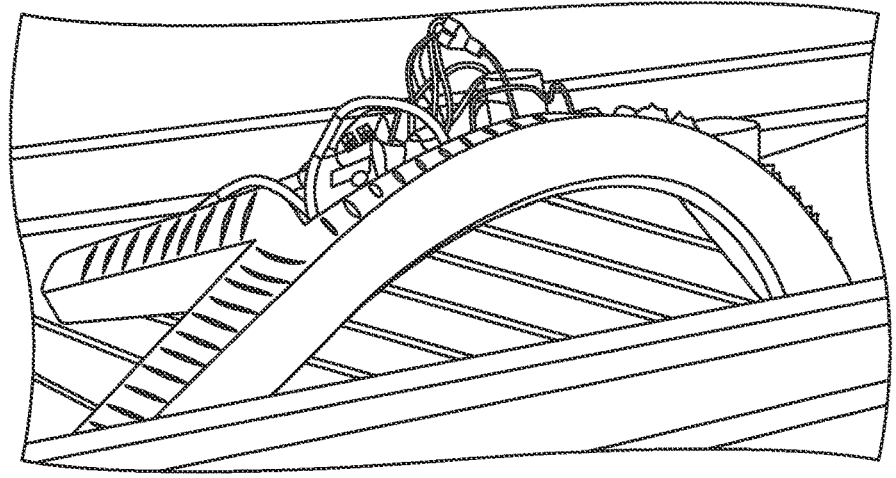

The robot walked down a ramp into a plastic tray filled with 5 cm (2 in) of water (FIG. 4C). The body of the robot is hydrophobic and inherently sealed against water (and is also resistant to acids). It suffered no damage walking through water.

We manually controlled the ambulation of a tethered version of the soft robot across a metal grating through two flames (FIG. 4B). The longest duration of direct flame exposure an element of the robot sustained was 20 seconds. Despite the exposure to extremely high temperatures (~3,000 K) the robot suffered only superficial damage due to the resistance of the silicone rubber to fire and high temperatures.

The design of the soft robot presented here has the additional advantages over previous hard and soft robots of autonomy of power, good operation time between battery charges, the capabilities of audio and video sensing, and the capacity to carry larger payloads for a desired task.

The exposed, rigid components at the center of the robot (compressors, valves, controller, batteries) can be sensitive to the conditions that typically challenge rigid robots (blunt impacts, applied pressures, and harsh environmental conditions). In one or more embodiments, the rigid components are distributed over the body of the robot and encasing them in the soft body material. Another embodiment includes replacing the rigid components with soft counterparts.

The locomotion speed of the robot is limited by the flow rate of air into the pneumatic actuators. This flow rate is, in turn, limited by the output pressure of the onboard compressors, as well as the flow restrictions caused by the onboard valves and tubing. Larger compressors, valves, and tubing all lead to a larger mass that must be carried by the body. In one or more embodiments, these components are optimized to improve the overall speed of the robot. Alternative modes of pressurization (i.e. combustion) can be used to increase actuation speeds. Optimization of the design of the legs and feet of the robot for locomotion would likely increase its speed and overall mobility.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

The invention claimed is:

1. A lightweight, high strength soft robot, comprising:
   a central body comprising at least two stiffening actuators and a reservoir configured to receive an on-board air compressor;
   a plurality of leg actuators connected to the central body;
   wherein each stiffening actuator and each leg actuator comprises a plurality of interconnected, pneumatic chambers comprising an extensible material, and each stiffening actuator and each leg actuator comprises void space or hollow spheres embedded in the extensible material; and
   a strain limiting base as a bottom wall of each stiffening and each leg actuator.

2. The soft robot of claim 1, wherein the extensible material is an elastomer with an elastic modulus of greater than 2 MPa.

3. The soft robot of claim 1, wherein the elastomer is capable of greater than 400% strain without failure.

4. The soft robot of claim 1, further comprising an electrically powered air compressor for providing pneumatic pressure to the one or more actuators.

5. The soft robot of claim 4, further comprising an on-board power source for operation of the electrically powered air compressor.

6. The soft robot of claim 1, further comprising an electrical wire connection connectable to an off-board power source.

7. The soft robot of claim 4, further comprising a valve system for reversible fluid communication between the one or more actuators and the electrically powered air compressor.

8. The soft robot of claim 7, further comprising a control system for controlling the operation of the electrically powered air compressor and/or the valves.

9. The soft robot of claim 8, wherein the control system controls the operation of the valve system.

10. The soft robot of claim 1, further comprising a load.

11. The soft robot of claim 10, wherein the load is an on-board actuation device.

12. The soft robot of claim 11, wherein the on-board actuation device is selected from the group consisting of air compressors, hydraulic actuators, explosive actuators.

13. The soft robot of claim 10, wherein the load comprises a power source.

14. The soft robot of claim 13, wherein the power source is selected from the group consisting of batteries, photovoltaic devices, and liquid, gas or solid fuels.

15. The soft robot of claim 10, wherein the load comprises one or more of a sensor or communications system or a visual recording or transmitting device.

16. The soft robot of claim 1, wherein the stiffening actuators stiffen upon actuation to support a load in the central body.

17. The soft robot of claim 1, wherein the stiffening actuators are parallel to each other, and the reservoir is disposed between the stiffening actuators.

* * * * *